United States Patent
Gruhlke et al.

(10) Patent No.: US 11,877,041 B2
(45) Date of Patent: Jan. 16, 2024

(54) SENSOR WITH MULTIPLE FOCAL ZONES

(71) Applicant: QUALCOMM Incorporated, San Diego, CA (US)

(72) Inventors: Russell Gruhlke, San Jose, CA (US); Ravindra Vaman Shenoy, Dublin, CA (US); Jon Lasiter, Stockton, CA (US); Donald William Kidwell, Campbell, CA (US); Khurshid Syed Alam, Mountain View, CA (US); Kebin Li, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 16/937,397

(22) Filed: Jul. 23, 2020

(65) Prior Publication Data

US 2022/0030148 A1    Jan. 27, 2022

(51) Int. Cl.
| | |
|---|---|
| *H04N 23/45* | (2023.01) |
| *H04N 23/55* | (2023.01) |
| *G01J 1/42* | (2006.01) |
| *G02B 13/18* | (2006.01) |

(52) U.S. Cl.
CPC ........... *H04N 23/45* (2023.01); *G01J 1/42* (2013.01); *G02B 13/18* (2013.01); *H04N 23/55* (2023.01)

(58) Field of Classification Search
CPC .. H04N 5/2258; H04N 5/2254; H04N 5/2253; G01J 1/42; G02B 13/18; G02B 2027/0123; G02B 13/002
See application file for complete search history.

(56) References Cited

U.S. PATENT DOCUMENTS

| | | | | |
|---|---|---|---|---|
| 5,153,778 A | * | 10/1992 | Sasian-Alvarado | G02B 5/1895 359/743 |
| 6,535,332 B1 | * | 3/2003 | Nakano | G02B 13/14 359/728 |
| 2003/0053032 A1 | * | 3/2003 | Nakano | G02B 27/4216 352/244 |
| 2005/0286138 A1 | * | 12/2005 | Matsusaka | G02B 15/143507 359/680 |
| 2007/0201148 A1 | * | 8/2007 | Eckhardt | G01J 1/0411 359/742 |
| 2010/0002313 A1 | | 1/2010 | Duparre et al. | |
| 2013/0265459 A1 | | 10/2013 | Duparre et al. | |
| 2015/0296137 A1 | * | 10/2015 | Duparre | H04N 13/271 348/48 |

(Continued)

OTHER PUBLICATIONS

International Search Report and Written Opinion—PCT/US2021/033937—ISA/EPO—dated Jul. 29. 2021.

*Primary Examiner* — Sinh Tran
*Assistant Examiner* — Zhenzhen Wu
(74) *Attorney, Agent, or Firm* — QUALCOMM Incorporated

(57) ABSTRACT

An image sensor including a planar sensor array, a lens configured to form an optical image on the planar sensor array and characterized by a locus of focal points on a curved surface, and a cover glass with multiple thickness levels or multiple cover glasses of different sizes. The one or more cover glasses are configured to shift the locus of focal points for large field angles, such that there are multiple intersections between the planar sensor array and the locus of focal points for a large FOV, and thus multiple zones with best focus on the planar sensor array.

29 Claims, 14 Drawing Sheets

(56) References Cited

U.S. PATENT DOCUMENTS

| | | |
|---|---|---|
| 2017/0343706 A1 | 11/2017 | Zhang |
| 2021/0003818 A1* | 1/2021 | Baba ...................... G02B 13/18 |
| 2021/0263290 A1* | 8/2021 | Vinogradov ............. G02B 3/12 |
| 2021/0396956 A1* | 12/2021 | Doujou .................. G02B 13/14 |
| 2021/0396961 A1* | 12/2021 | Xie ........................ H04N 23/55 |

* cited by examiner

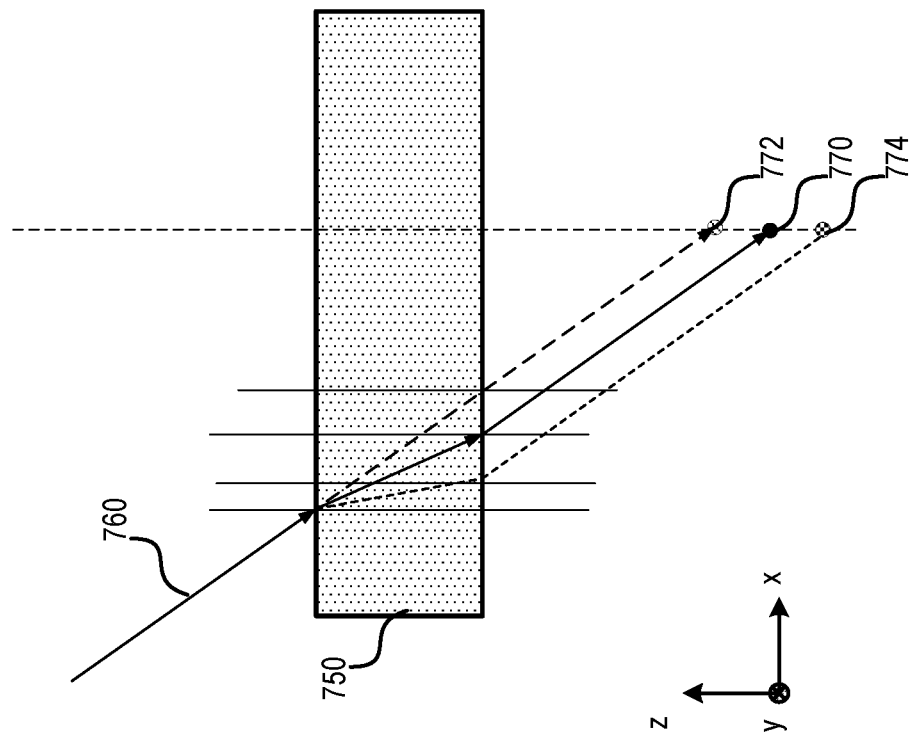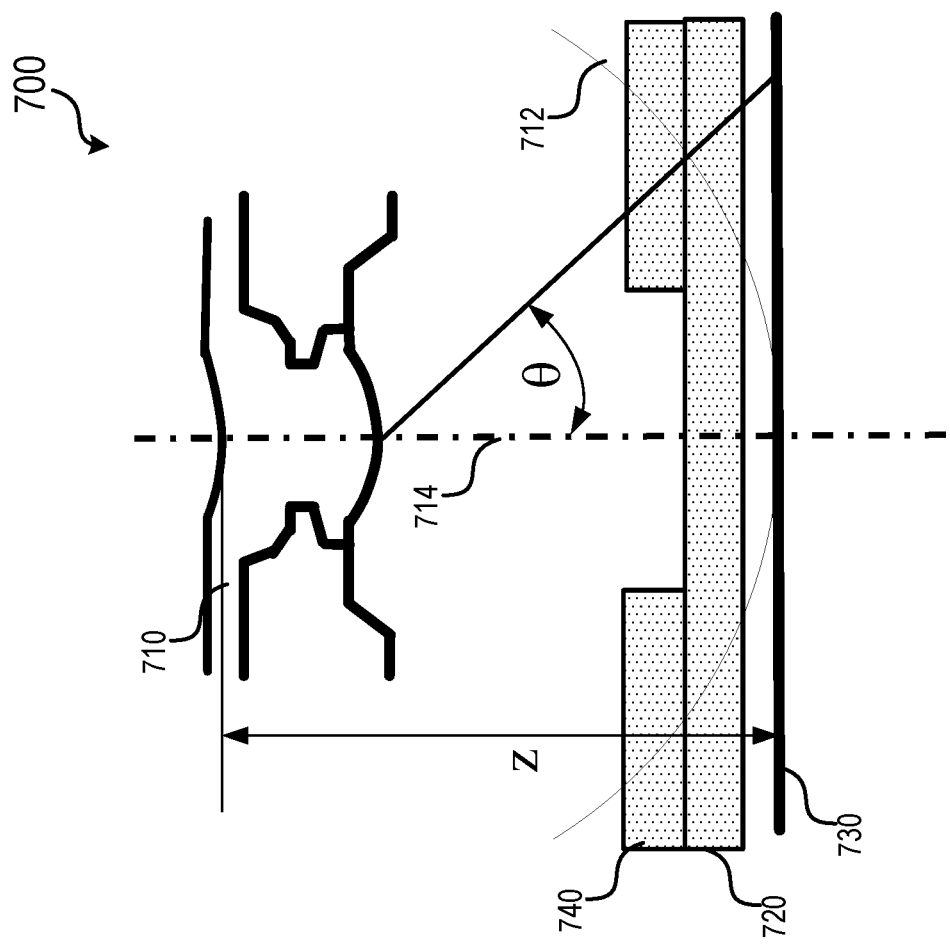
FIG. 7B
FIG. 7A

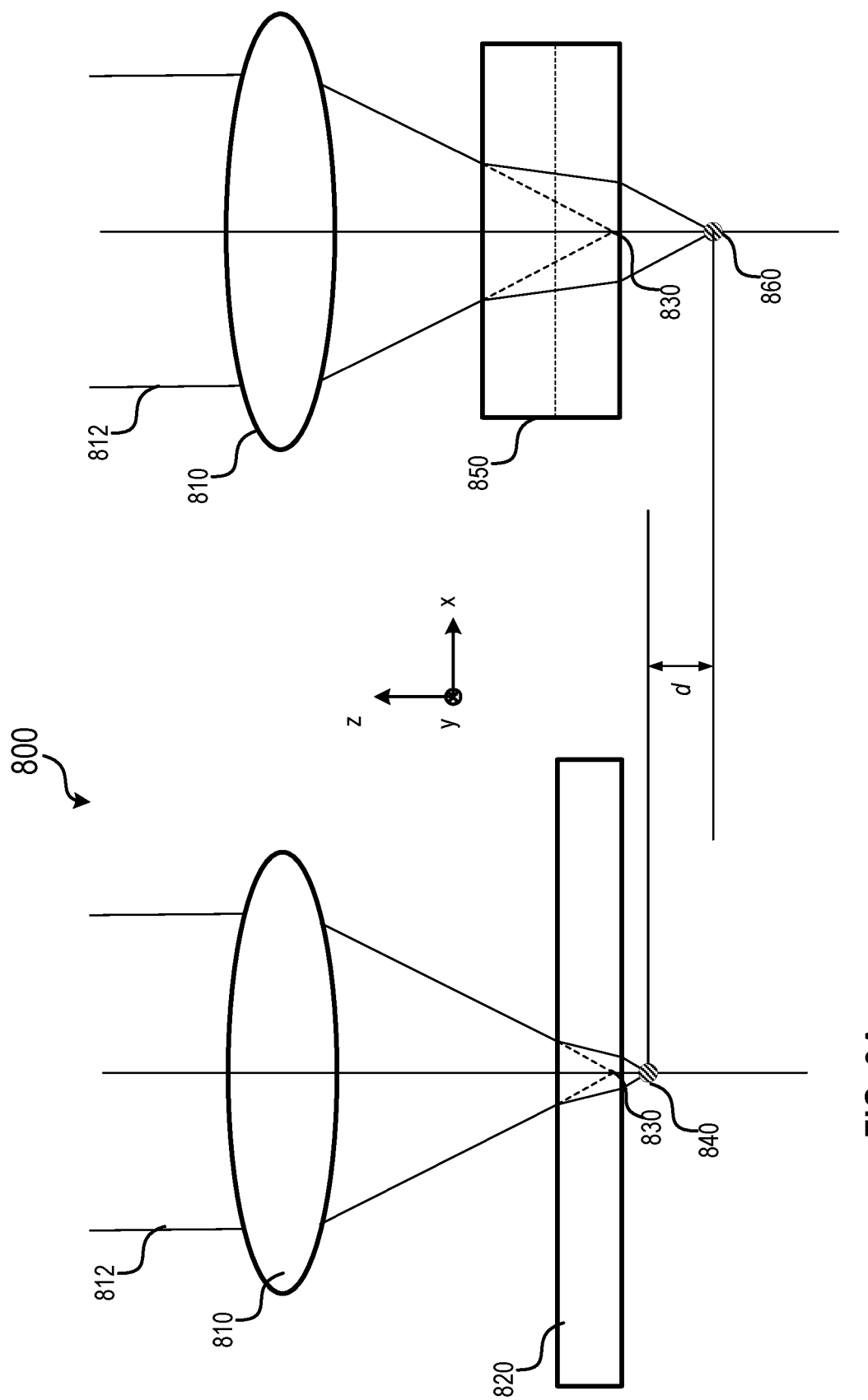

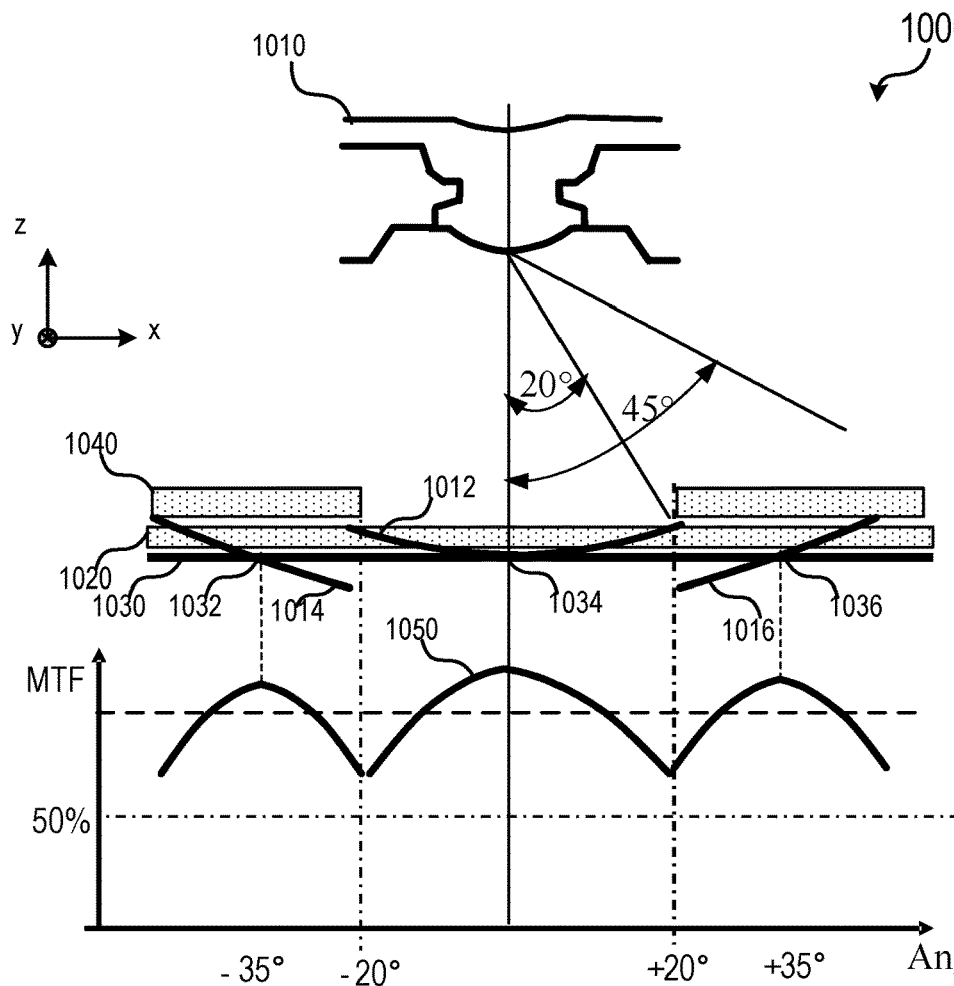
FIG. 10A
FIG. 10B
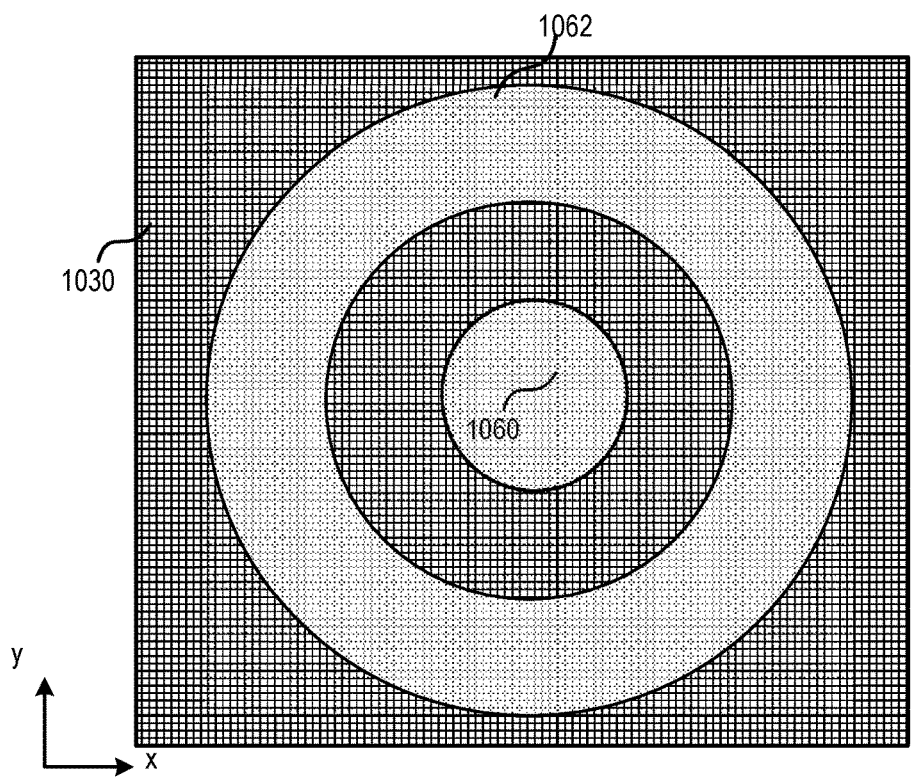
FIG. 10C

SENSOR WITH MULTIPLE FOCAL ZONES

BACKGROUND

Computer vision involves acquiring, processing, analyzing, and understanding images for use in various applications. In a computer vision system, an optical subsystem may form optical images of objects, scenes, events, or other environmental features onto an image sensor. The image sensor may capture images or videos of the environmental features by converting optical images into electrical image data. An image processor coupled to the image sensor may perform certain computer vision operations on the acquired image data to detect features in the image data and/or changes among different frames in the image data. The detected features and/or changes may be used in a variety of applications, such as object classification, face recognition, motion detection, object/feature tracking, gesture detection, user authentication, autonomous driving, and the like. For example, features extracted from images or videos can be used for liveness detection and/or biometric authentication to prevent spoofing. The electrical image data generated by the image sensor can also be used in other applications, such as depth-sensing, location tracking, augmented reality (AR), virtual reality (VR), mixed reality (MR) applications, and the like.

For many computer vision applications, images with a high resolution, high contrast, and high dynamic range are generally desired. In addition, the field of view of the computer vision system may need to be large to capture features in a large scene or in a large angular range, for example, for object detection. To achieve the high image resolution, image contrast, and the large field of view, both the optical subsystem and the image sensor would need to have high performance, such as a high resolution and a large field of view.

SUMMARY

Techniques disclosed herein relate generally to image sensors. More specifically, disclosed herein are techniques for improving the modulation transfer function of an image sensor for a large field of view. Various inventive embodiments are described herein, including devices, systems, components, apparatuses, methods, materials, and the like.

According to certain embodiments, an image sensor may include a planar sensor array, a lens configured to form an optical image on the planar sensor array and characterized by a locus of focal points on a curved surface, a first planar cover glass on the planar sensor array, and a second cover glass on a first area of the first planar cover glass and configured to shift a first portion of the locus of focal points of the lens such that the first portion of the locus of focal points intersects the planar sensor array at one or more points.

In some embodiments of the image sensor, a focal length of the lens and a linear dimension of the planar sensor array may be selected such that the image sensor is characterized by a field of view greater than ±30°. The planar sensor array may be positioned to intersects a second portion of the locus of focal points of the lens at an optical axis of the lens. The planar sensor array may intersect the locus of focal points of the lens at two or more separate focal zones.

In some embodiments of the image sensor, the first area of the first planar cover glass may include a peripheral region of the first planar cover glass. In some embodiments, the first area of the first planar cover glass may corresponds to field angles greater than 15°. In some embodiments, the second cover glass is a planar cover glass. The second cover glass may be characterized by at least two different thickness levels. For example, the second cover glass may include a vertical stack of two or more planar cover glasses having different dimensions, or may include two or more planar cover glasses positioned in different areas on the first planar cover glass and having different thicknesses or refractive indices.

In accordance with an example implementation, an apparatus may include a printed circuit board, a cover mounted on the printed circuit board and having an aperture, a lens positioned in the aperture, a planar sensor array electrically coupled to the printed circuit board, a first planar cover glass on the planar sensor array, and a second cover glass on a first area of the first planar cover glass and configured to shift a first portion of a locus of focal points of the lens such that the first portion of the locus of focal points intersects the planar sensor array. In some embodiments, the apparatus may also include a processor coupled to the planar sensor array directly or through the printed circuit board.

In some embodiments of the apparatus, the lens may include a single aspherical lens and may be configured to form an optical image on the planar sensor array. The lens and the planar sensor array may be configured such that the apparatus is characterized by a field of view greater than ±30°. In some embodiments, the lens is characterized by a focal length less than 20 mm. In some embodiments, the planar sensor array may be positioned to intersect a second portion of the locus of focal points of the lens at an optical axis of the lens. In some embodiments, the planar sensor array may intersect the locus of focal points of the lens at two or more separate focal zones.

In some embodiments, the first area of the first planar cover glass may include a peripheral region of the first planar cover glass. In some embodiments, the second cover glass may be a planar cover glass. In some embodiments, the second cover glass may be characterized by at least two different thickness levels. For example, the second cover glass may include a vertical stack of two or more planar cover glasses having different dimensions, or may include two or more planar cover glasses positioned in different areas on the first planar cover glass and having different thicknesses or refractive indices. In some embodiments, the second cover glass may include a tapered edge. In some embodiments, the second cover glass may be characterized by a ring shape.

In accordance with an example implementation, an optical sensor may include a planar sensor array, a lens configured to form an optical image on the planar sensor array and characterized by a locus of focal points on a curved surface, and a cover glass on the planar sensor array and including a first region and second region. The second region of the cover glass may have a higher thickness or a higher refractive index than the first region of the cover glass and may be configured to shift a first portion of the locus of focal points of the lens such that the first portion of the locus of focal points intersects the planar sensor array at one or more points.

In some embodiments, the second region of the cover glass may correspond to field angles greater than 15°. The planar sensor array may be positioned to further intersect a second portion of the locus of focal points of the lens at an optical axis of the lens. The cover glass may include a vertical stack of two or more planar plates characterized by different respective sizes.

According to certain embodiments, an apparatus may include means for forming an optical image of an object, where a locus of focal points of the means for forming the optical image may be on a curved surface. The apparatus may also include means for receiving and converting the optical image into electrical image data, means for covering and protecting the means for receiving and converting the optical image, and means for shifting a first portion of the locus of focal points such that the first portion of the locus of focal points intersects the means for receiving and converting the optical image at one or more points. In some embodiments, the means for receiving and converting the optical image may be positioned to further intersect a second portion of the locus of focal points.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the present disclosure are illustrated by way of example. Non-limiting and non-exhaustive aspects are described with reference to the following figures.

FIG. 7A illustrates an example of an image sensor with multiple cover glasses to form multiple focal zones according to certain embodiments.

FIG. 7B illustrates an example of shifting the locus of focal points of an image sensor using a cover glass according to certain embodiments.

FIG. 8A illustrates an example of shifting the locus of focal points of an image sensor using a thin cover glass according to certain embodiments.

FIG. 8B illustrates an example of shifting the locus of focal points of an image sensor using a thick cover glass according to certain embodiments.

FIG. 10A illustrates an example of an image sensor with multiple cover glasses according to certain embodiments.

FIG. 10B illustrates the MTF for different field angles of the example of the image sensor shown in FIG. 10A according to certain embodiments.

FIG. 10C illustrates the focal zones of the example of the image sensor shown in FIG. 10A according to certain embodiments.

Figure 1:
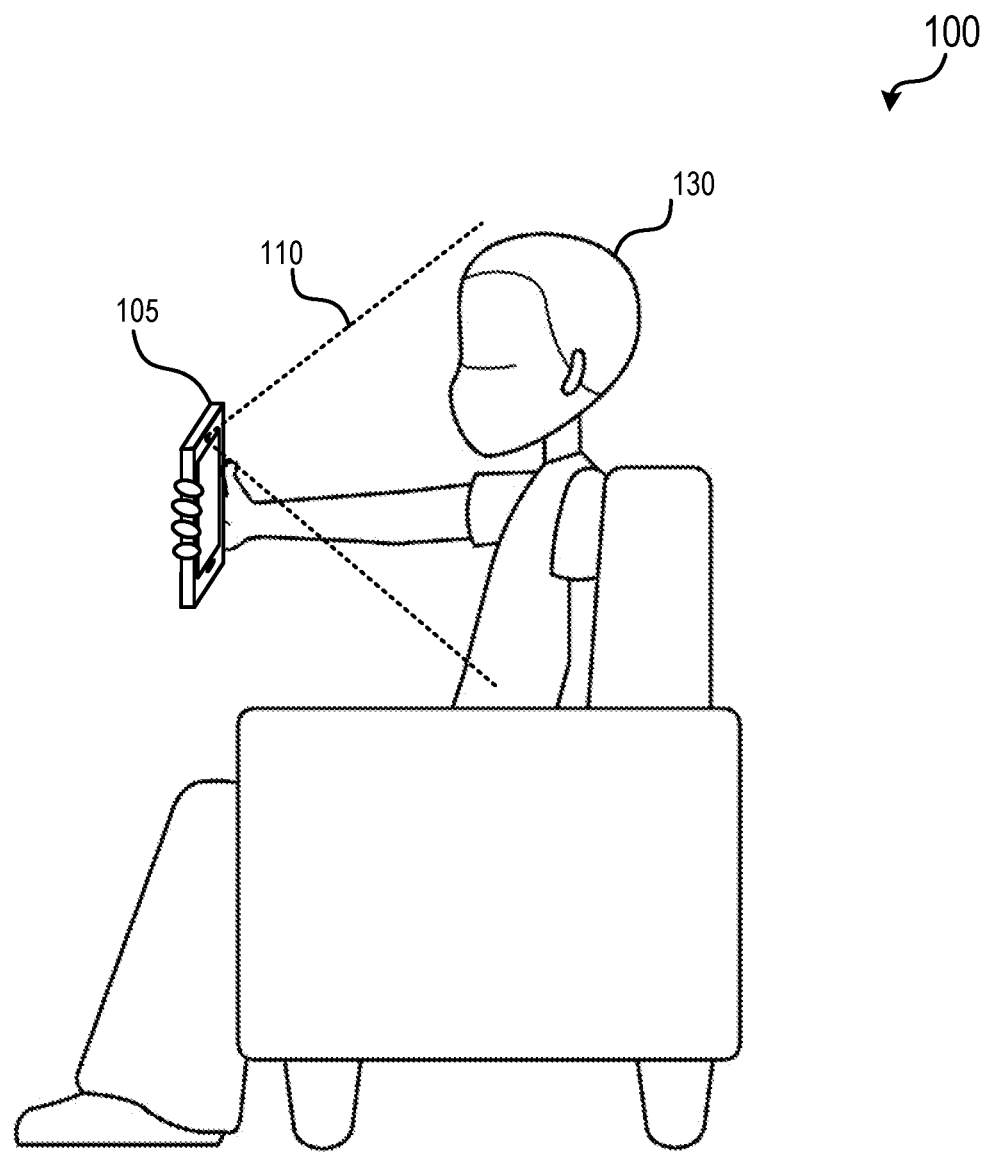
FIG. 1 illustrates an example of a setup in which a user may interact with a mobile device that incorporates the features and techniques described herein.

In the figures, like reference numerals refer to like parts throughout various figures unless otherwise specified. In addition, multiple instances of a component may be distinguished by following the reference numeral by a second label (e.g., a letter or a number), or a dash and a second label. If only the first reference label is used in the specification, the description is applicable to any one of the similar components having the same first reference numeral irrespective of the second label.

DETAILED DESCRIPTION

This disclosure relates generally to image sensors. More specifically, disclosed herein are techniques for improving the modulation transfer function of an optical subsystem of an image sensor for a large field of view (FOV). According to certain embodiments, multiple flat cover glasses or a cover glass with multiple thickness levels may be used to shift the locus of focal points of an image sensor for large field angles to achieve multiple focal zones on a flat image sensor chip, thereby achieving high angular resolution and contrast (and thus a high modulation transfer function (MTF)) for a large FOV in the images captured by the image sensor chip. Various inventive embodiments are described herein, including devices, systems, apparatuses, components, methods, materials, and the like.

Image sensors on mobile devices or sensing devices (e.g., a scanner) may include an optical subsystem that includes a single lens with a small aperture and a short focal length to reduce the cost and form factor of the image sensors and the devices. Due to the relatively constant focal length of the lens for light from different field angles (or view angles), the locus of focal points for features in different field angles may have a semicircle shape in the image space, thereby resulting in an optical aberration known as the Petzval field curvature. As such, the angular resolution of the image sensor having a flat image plane (e.g., a flat photosensor array) may vary with the field angle.

The Petzval field curvature may be accommodated using a curved sensor that has the same curvature as the locus of focal points. For example, human eyes may accommodate for the Petzval field curvature due to the curved shape of the retina. However, image sensor chips, such as Charge Coupled Device (CCD) image sensor chips or Complementary Metal-Oxide Semiconductor (CMOS) image sensor chips (also known as Active-Pixel Sensor (APS)), are generally planar devices. Therefore, the best focus may only occur in a zone around the intersection points between the image sensor chip and the curved locus of the focal points of the optical subsystem. Another method to accommodate for the Petzval field curvature is adding an additional lens to flatten the curvature of the locus of focal points. This method may increase the complexity, cost, and size of the image sensor, and thus may not be suitable for use in many low-cost or compact devices.

According to certain embodiments, a cover glass with multiple thickness levels or multiple cover glasses of different sizes may be used to shift the locus of focal points of the lens for larger field angles, such that there may be multiple intersections between a planar image sensor chip and the locus of focal points of the image sensor for a large FOV. The cover glass(es) may have a higher overall thickness or overall optical path length in an area farther away from the optical axis. Therefore, for features from large field angles, the focal points that may be farther away from the optical axis and may otherwise be away from the image sensor chip due to the Petzval field curvature can be shifted towards the image sensor chip to achieve a better focus on the image sensor chip. As a result, best angular resolution/contrast may be achieved at multiple regions of the image sensor chip that correspond to multiple field angle ranges, rather than only achieving the best resolution at a single zone (e.g., at or near the optical axis). The angular resolution/contrast at other regions of the image sensor chip corresponding to other field angle ranges may also be improved due to the partial flattening of the locus of focal points.

Techniques disclosed herein can improve the angular resolution and contrast (and thus the modulation transfer function) of an image sensor for a large FOV (e.g., within) ±45°), without adding additional curvature flattening lens(es) or changing the shape of the existing lens in the image sensor. One or more cover glasses that are easy to manufacture and assemble are used to create two or more focal zones with the best focus and to improve the focus in other zones, thereby improving the angular resolution/contrast in a large FOV.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In some instances, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 illustrates an example of a setup 100 in which a user 130 may interact with a mobile device 105 that incorporates certain features and techniques described herein. In the illustrated example, user 130 may interact with mobile device 105, at least in part, via a sensor system that includes a camera, dedicated computer vision (CV) computation hardware, and a dedicated low-power microprocessor as described below. It is understood that "low-power" here is intended to refer to electrical power, not computational power. These features enable mobile device 105 to detect, track, recognize, and/or analyze a subject (such as user 130) and other objects and scenes within an FOV 110 of the camera. The sensor system may capture and process information received by the camera using the embedded microprocessor, and send "events" or other indications that one or more objects are detected or one or more activities (e.g., eye blinking) have occurred to a general-purpose processor only when needed or as defined and configured by the application. This allows the general-purpose processor (which is typically relatively high-speed and high-power to support a variety of applications) to stay in a low-power mode (e.g., sleep mode) most of the time, while becoming active only when events or other indications are received from the sensor system. While illustrated and described with reference to mobile device 105 capturing images of a user or the face of the user, it is understood that the sensor system described herein is capable of performing the common image capturing (e.g., photography), object recognition, motion detection, barcode or Quick Response (QR) code scanning, and the like, and can be useful in a variety of applications including internet of things (IoT) applications.

In some embodiments, the dedicated CV computation hardware may compute or is capable of computing CV features, such as localized CV features for each sensor element (e.g., pixel) in a sensor array unit, based on, at least in part, signals associated with neighboring sensor elements. As used herein, the term "local" or "localized" refers to features computed based on one or more neighboring sensor elements rather than statistical or other mathematical evaluation of the entire image. As described herein, sensor elements (e.g., pixels) including a subject sensor element and other sensor elements relatively close to the subject sensor element may be referred to as neighboring sensor elements. In certain aspects of the disclosure, the neighboring sensor elements may include the subject sensor element and sensor elements immediately adjacent to the subject sensor element. In some embodiments, neighboring sensor elements may also include sensor elements that are relatively close to the subject sensor element but are not immediately adjacent to the subject sensor element. For example, in certain instances, sensor elements within three sensor elements from the subject sensor element may still be considered neighboring sensor elements. In some embodiments, CV features or localized CV features may include low level computer vision markers or indicators, such as labels associated with each sensor element of the sensor system. Such localized CV features may include outputs such as a Histogram of Signed Gradients (HSG) and/or a Local Binary Pattern (LBP).

In setup 100 illustrated in FIG. 1, user 130 may have picked up mobile device 105 while the mobile device's general-purpose processor is in a sleep mode. The sensor system of mobile device 105, however, may remain active and may be capable of, for example, recognizing the face of user 130, a hand gesture, a facial expression (e.g., eye blink), other objects in the scene, and the like. Upon recognizing the occurrence of certain target events, such as the specific facial features of user 130 moved within the sensor system's field of view 110, the sensor system may send an event or another notification to the mobile device's general-purpose processor indicating that the facial features of user 130 have been detected and recognized, thereby causing the mobile device's general-purpose processor to exit the low-power mode and become fully active.

Target events that may trigger the sensor system to send an event to the mobile device's general-purpose processor may include any of a variety of CV-detectable events, depending on desired functionality. These events may include, for example, facial and/or object detection, facial and/or object recognition, gesture recognition, facial and/or object movement detection, and the like. In some embodiments, one or more target events may be configured by user 130.

In some embodiments, the camera may perform pixel-level computer vision feature computations like LBPs, Gradients, Edges, HSGs, and/or other operations in which readings from neighboring sensor pixels of the camera are used to compute CV features for a low-power hardware-based computation of the CV features.

Although the sensor system described with respect to FIG. 1 may include a special-purpose camera for CV applications, embodiments are not so limited. The sensor system and the techniques disclosed herein may be used to click photographs or shoot videos. Additionally, although FIG. 1 and other embodiments describe a sensor system being incorporated into a mobile device, embodiments are not so limited. Image quality improvement brought by the techniques and features described herein can have particular benefits to compact mobile devices, such as sports cameras, mobile phones, tablets, laptops, portable media players, and the like, due to the cost and size constraints. Other devices that include image sensors, such as desktop computers, vehicles (e.g., autonomous vehicles or unmanned aerial vehicles), close-circuit security cameras, or the like, may utilize the features and techniques described herein.

Figure 2:
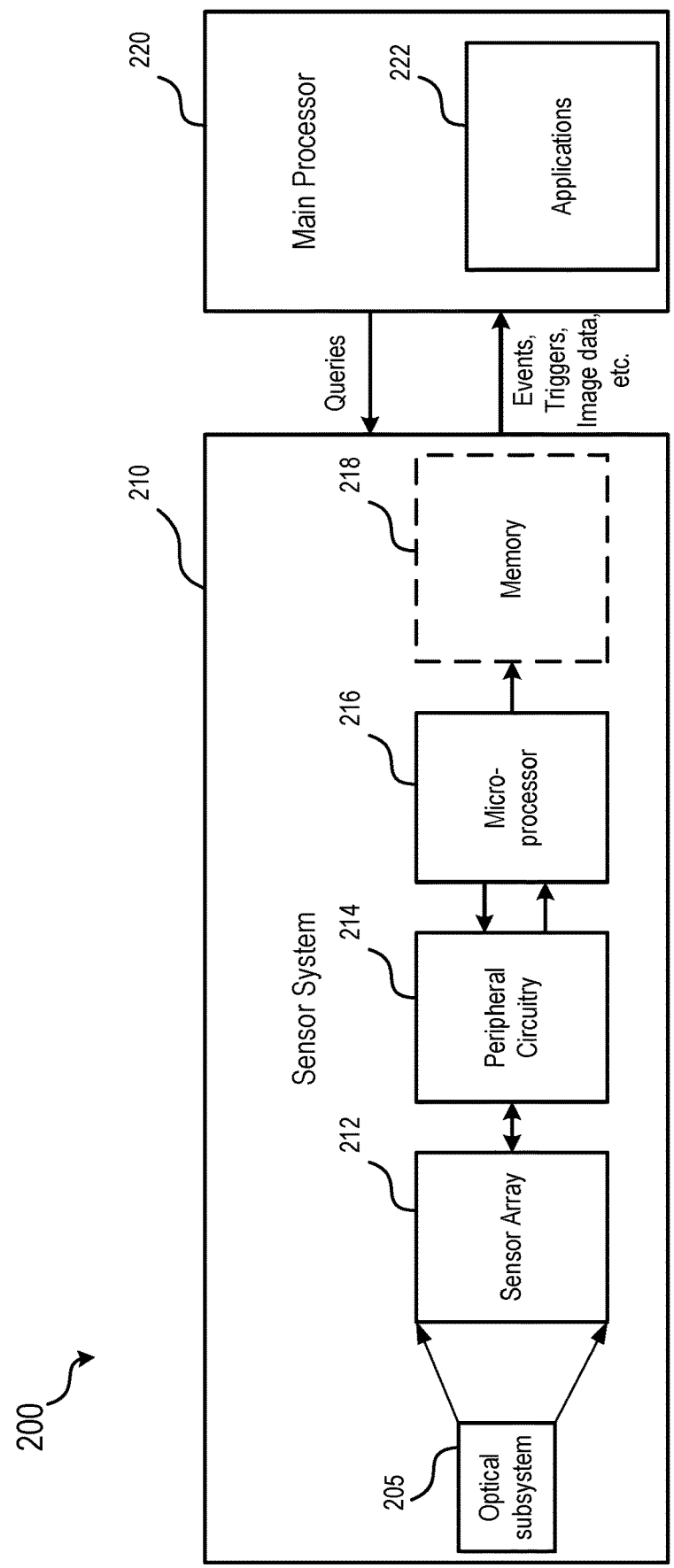
FIG. 2 is a block diagram of an example of a computer vision system including an image sensor and a main processor according to certain embodiments.

FIG. 2 illustrates a block diagram of an example of a computer vision system 200 including a sensor system 210 and a main processor 220 according to certain embodiments. Computer vision system 200 may be an example of the sensor system of mobile device 105. According to one embodiment, sensor system 210 may be configured to enable high-level sensing operations, while main processor 220 may normally operate in a low-power (e.g., "sleep" or "stand-by") mode. Components of FIG. 2 can be incorporated into a larger electronic device, such as a sports camera, mobile phone, tablet, laptops, security camera, or the like.

As illustrated in FIG. 2, sensor system 210 may include an optical subsystem 205, a sensor array 212, peripheral circuitry 214, a microprocessor 216, and/or memory 218. Sensor array 212, peripheral circuitry 214, microprocessor 216, and/or memory 218 may be integrated into a same image sensor chip or a same package. Sensor system 210 can be communicatively coupled through either a wired or wireless connection to main processor 220 of an electronic device (such as an application processor of a mobile phone), which can send queries to the sensor system 210 and receive events and/or other triggers from the sensor system 210. In some implementations, microprocessor 216 can correspond to a dedicated microprocessor or a first processing unit, and can be configured to consume less electrical power than main processor 220, which can correspond to a second processing unit. In various embodiments, computation and processing functionality may be distributed in various ways across microprocessor 216 and main processor 220.

Optical subsystem 205 may include, for example, an optical lens or an array of micro-lenses that can focus light from environmental features (e.g., objects and scenes) to form an optical image of the environmental features onto sensor array 212. The optical lens may include a single lens or a group of lenses. For example, the optical lens may include a spherical lens or an aspherical lens that is designed to have small optical aberrations. The optical lens may have a short focal length, such that the optical image can have a small size and the optical lens can be positioned close to sensor array 212 to reduce the physical size of sensor system 210. The optical image may have a size comparable to the size of sensor array 212. In some embodiments, optical subsystem 205 may include one or more filters, such as color filters (e.g., ultraviolet or infrared light filters), polarizing filters, neutral density filters, close-up filters, and the like.

Sensor array 212 may include an array (e.g., a one- or two-dimensional array) of sensor cells (or pixels) for sensing optical signals. Sensor array 212 can include, for example, a CCD image sensor that includes arrays of photosensors and metal-oxide-semiconductor (MOS) capacitors, or a CMOS APS image sensor that includes arrays of photodiodes and MOS field-effect transistor (MOSFET) amplifiers.

In some embodiments, sensor array 212 may include some memory and/or logic circuitry with which operations on one or more outputs of the sensor cells may be performed. In some embodiments, each sensor pixel in the sensor array may be coupled to the memory and/or logic circuitry, which may or may not be part of the peripheral circuitry 214. The output of sensor array 212 and/or peripheral circuitry 214 may include output data in addition or as an alternative to the raw sensor readings of the sensor cells. For example, in some embodiments, sensor array 212 and/or peripheral circuitry 214 can include dedicated CV computation hardware. CV features can be computed or extracted by the dedicated CV computation hardware using readings from neighboring sensor pixels of sensor array 212. The computed or extracted CV features can include, for example, a computed HSG and/or an LBP feature, label, or descriptor. Other CV computations can also be performed based on other CV computation algorithms, such as edge detection, corner detection, scale-invariant feature transform (or SIFT), speeded up robust features (SURF), histogram of oriented gradients (HOG), local ternary patterns (LTPs), and the like, as well as extensions of any of the above algorithms.

The synchronicity (or asynchronicity) of sensor array 212 may also depend on desired functionality. For example, in some embodiments, sensor array 212 may include a frame-based readout circuitry timed to provide periodic sampling of each pixel. In some embodiments, sensor array 212 may include an event-driven array, where sensor output may be generated when a sensor reading or another output reaches a certain threshold value or changes by a certain threshold value, rather than (or in addition to) adhering to a particular constant sampling rate.

Peripheral circuitry 214 may receive information from sensor array 212. In some embodiments, peripheral circuitry 214 may receive information from some or all pixels within sensor array 212, some or all in-pixel circuitry of sensor array 212 (in implementations with significant in-pixel circuitry), or both. In embodiments where sensor array 212 provides a synchronized output, peripheral circuitry 214 may provide timing and/or control operations on the sensor array unit output (e.g., execute frame-based and/or similar timing). Other functionality provided by the peripheral circuitry 214 can include an event-queuing and/or processing operation, analog processing, analog-to-digital conversion, an integration operation (e.g. a one- or two-dimensional integration of pixel values), CV feature computation, object classification (for example, cascade-classifier-based classification or histogram-based classification), histogram operation, memory buffering, or any combination thereof.

Some embodiments may include microprocessor 216 coupled to the output of peripheral circuitry 214. Microprocessor 216 may generally include a processing unit that operates on relatively low power compared with main processor 220. In some implementations, microprocessor 216 can further execute certain computer vision and/or machine-learning algorithms (which can be frame- and/or event-based). Thus, microprocessor 216 may be able to perform certain computer vision and/or machine learning functions based on data received from sensor array 212 while main processor 220 operates in a low-power mode. When microprocessor 216 determines that an event or condition that may need to be handled by main processor 220 has taken place, microprocessor 216 can communicate with main processor 220 regarding the event or condition to bring main processor 220 out of its low-power mode and into a normal operating mode.

In some embodiments, the output of microprocessor 216 may be provided to memory 218 before being sent to main processor 220. In some implementations, memory 218 may be shared between microprocessor 216 and main processor 220. Memory 218 may include working memory and/or data structures maintained by microprocessor 216. Memory may be utilized, for example, for storing images, tracking detected objects, and/or performing other operations. Additionally or alternatively, memory 218 can include information that main processor 220 may query from sensor system 210. Main processor 220 can execute applications 222, some of which may utilize information received from sensor system 210.

The ability of sensor system 210 to perform certain functions, such as image processing and/or computer vision functions independent of main processor 220 can provide for power, speed, and memory savings in an electronic device that would otherwise utilize main processor 220 to perform some or all of image processing functions. In one example, a mobile phone having the configuration shown in FIG. 2 can use facial detection to exit out of a standby mode. In this example, the mobile phone enters into a standby mode in which a display of the mobile phone is powered down, while main processor 220 operates in a low-power or sleep mode. However, sensor system 210 with an image array (e.g., sensor array 212) may continue to capture and process image data at a certain rate (e.g., a few samples per second) while objects enter and exit the field of view of sensor system 210. When a face enters the field of view of sensor system 210, the face may be imaged by optical subsystem 205 onto sensor array 212, and detected by sensor array 212, peripheral circuitry 214, microprocessor 216, or any combination thereof. If the detected face remains in the field of view of sensor system 210 for a certain period of time (e.g., 0.5 seconds, 1 second, 2 seconds, etc.), microprocessor 216 may send an a facial-detection event to main processor 220, indicating that a face is detected. Main processor 220 and the display of the mobile phone may then be switched back to normal operating mode.

It is noted that alternative embodiments may vary from the components shown in FIG. 2. For example, embodiments of sensor system 210 may or may not include peripheral circuitry 214, microprocessor 216, and/or memory 218. Additionally or alternatively, embodiments may combine, separate, add, omit, and/or rearrange the components of FIG. 2, depending on desired functionality.

Figure 3:
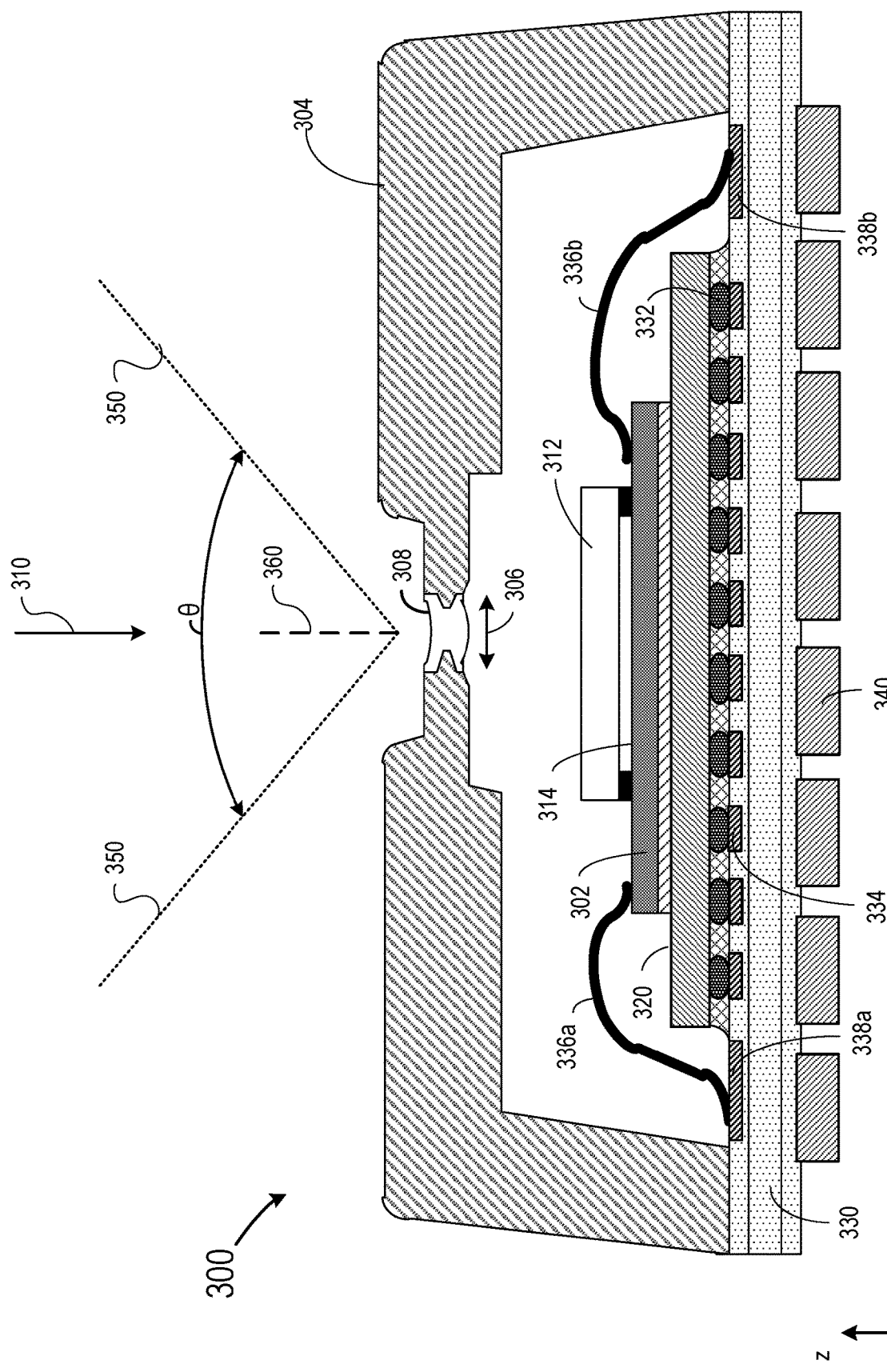
FIG. 3 includes a cross-sectional view of an example of an image sensor according to certain embodiments.

FIG. 3 illustrates an example of an image sensor 300 according to certain embodiments. Image sensor 300 may be an example of sensor system 210 shown in FIG. 2. Image sensor 300 can be part of a mobile device, such as a smart phone, a laptop, a camera, an Internet-of-Thing (IoT) device, and the like. For example, image sensor 300 may be a part of mobile device 105. In the illustrated example, image sensor 300 includes a sensor array 302 (e.g., sensor array 212) housed within a cover 304. Cover 304 may be made of a polymer material or another dielectric material to provide physical protection and insulation to sensor array 302. Cover 304 may include a window 306 in which a single lens 308 can be mounted. Lens 308 may be an aspherical lens that may have a short focal lens and a wide angle of view range, thus allowing features in a large field of view to be included in a captured photograph. In some embodiments, image sensor 300 may include a cover glass 312 mounted on top of a surface 314 of sensor array 302 to protect sensor array 302. In some implementations, image sensor 300 may further include one or more optical filters (e.g., a Bayer filter array, not shown in FIG. 3) to filter or modify the light (e.g., the intensity, phase, color, or polarization of the light) received by each element (also referred to as a pixel or a cell) of sensor array 302. In some embodiments, cover glass 312 may be one of the one or more optical filters.

Sensor array 302 can be configured to detect light 310 that is collected and focused by lens 308. Sensor array 302 may be configured to detect light on the front side or the back side. Sensor array 302 may include an array of pixels. Each pixel in the array may include a photosensor, such as a photodiode that can generate an electrical voltage or current signal corresponding to the intensity of the optical signal illuminating the pixel. For example, each pixel may convert the optical signal incident on the pixel to an electrical current or integrate the current using a capacitor to generate a voltage signal. The current or voltage signal may be converted to digital pixel data by an analog-to-digital converter. Therefore, each pixel may generate digital pixel data representing an intensity of light 310 received by the pixel. The pixel data from the pixels in sensor array 302 may represent an image of an object or a scene.

In some embodiments, sensor array 302 may include peripheral circuits (e.g., peripheral circuitry 214), such as a row decoder and driver circuit and a column decoder and driver circuit at the boundary of the array of pixels for selectively activating one or more pixels (e.g., a row of pixels) to read the current or voltage signals. In some implementations, an array of analog-to-digital convertors each corresponding to a column of pixels may be used to convert the current or voltage signals from each row of pixels to digital pixel data. In some implementations, the peripheral circuits may include local memory for temporally storing analog or digital data. In some implementations, sensor array 302 may include an address event representation (AER) image sensor, where the peripheral circuits may include timing, control, and support circuits, address encoder circuits, and reference generator circuit. In an AER image sensor, each pixel may include an integrator for integrating the converted voltage or current signal, and a comparator for comparing the integrated voltage or current signal with a reference level. When the integrated signal is greater than the reference level, an event signal, such as a spike or a digital pulse, may be generated by the pixel and sent to the address encoder, which may encode the address of the pixel that generates the event signal. A processor may receive the sequence of address data with embedded timing information, decode the address data, and duplicate the events or generate an image.

In some embodiments, sensor array 302 may include a CMOS sensor array. A CMOS image sensor is an integrated circuit for electronically capturing images using APS technology. Unlike CCD image sensors, CMOS sensors are produced using mainstream microelectronic fabrication processes. Advantages of the CMOS APS technology include low cost, small size, and the ability to integrate a significant amount of Very-Large-Scale-Integrated (VLSI) electronics on-chip. In a CMOS APS device, each pixel of the image sensor array may have both a photodetector and an active transistor circuitry for reading the output signal from the photodetector on the pixel. The photodetector for each pixel in the image sensor array may convert photons incident on the pixel to electric charge via the photoelectric effect. The charge may be integrated over a period of time that is long enough to collect a detectable amount of charge, but short enough to avoid saturating the storage elements. This period of time for the charge integration is analogous to a film exposure time (i.e., the shutter speed) and may also be referred to as an integration time. In the image sensor array of the CMOS APS device, the integration time may be the time between a reset of a given row and a subsequent read of the row.

Image sensor 300 may further includes a processor 320 (e.g., microprocessor 216) coupled to (e.g., bonded to or integrated into the chip of) sensor array 302 and configured to receive and process the pixel data generated by sensor array 302 for various applications as described above. In some embodiments, all or part of the peripheral circuits described above may be integrated into the chip that includes processor 320. Processor 320 can execute an imaging application to construct an image based on the pixel data. As described above with respect to FIGS. 1 and 2, processor 320 may also execute one or more CV applications, one or more machine learning applications, and the like, to analyze the image for various other applications, such as object detection and identification, sensing and ranging, liveness detection, user authentication, bar code or QR code reading, and the like. In some examples, sensor array 302 and processor 320 may be monolithically integrated into a same chip on a same substrate, or may be housed in a same package.

To reduce the horizontal footprint (e.g., on the x-y plane) of image sensor 300, sensor array 302 and processor 320 (as well as cover glass 312) may be arranged in a vertical stack (e.g., along the z-axis). Image sensor 300 may include a circuit board 330, on which the stack that includes sensor array 302, processor 320, and cover glass 312 may be mounted. Circuit board 330 may include a printed circuit board (PCB) and may provide electrical connections to sensor array 302 and processor 320. For example, processor 320 may include flip-chip connectors (e.g., flip-chip connectors 332), bond wires, and the like, which can be soldered onto pads 334 of circuit board 330. Image sensor 300 may also include bond wires 336a and 336b that are soldered onto pads 338a and 338b of circuit board 330 and bonding pads on sensor array 302 to provide electrical connections between sensor array 302 and circuit board 330. Circuit board 330 can include circuits to provide electrical connections between pads 334 and 338 to enable communication between sensor array 302 and processor 320. Cover 304 can be mounted on circuit board 330 to enclose and house sensor array 302 and processor 320 to form a package of image sensor 300. Circuit board 330 may include connectors 340 to provide electrical connections between image sensor 300 and other components of the mobile device, such as the main processor (e.g., main processor 220) of the mobile device and the power supply (e.g., battery) on the mobile device.

As shown in FIG. 3, image sensor 300 may have an FOV 350 for imaging. FOV 350 can have an angle of θ around an optical axis 360 perpendicular to circuit board 330. In the example shown in FIG. 3, optical axis 360 aligns with, for example, the z-axis when circuit board 330 is parallel with x-y plane. FOV 350 may be determined based on both the properties (e.g., focal length) of lens 308 and the dimensions of surface 314 of sensor array 302. For a given size of sensor array 302, the shorter the focal length of lens 308, the wider the angular field of lens 308 and image sensor 300. For example, if the focal length of lens 308 is f and surface 314 has a dimension h on the horizontal plane (e.g., x-y plane), the FOV angle θ on the horizontal plane can be approximately determined by $$\theta = 2\arctan\left(\frac{h}{2f}\right).$$

The focal length f of lens 308 may be, for example, less than 25 mm, less than 20 mm, less than 10 mm, or less than 5 mm.

The FOV can be defined on different planes. For example, FOV angle θ can be a horizontal FOV (HFOV) in the x-z plane that can be determined based on the horizontal dimension of sensor array 302 (e.g., in the x direction), a vertical FOV (VFOV) in the y-z plane that can be determined based on the vertical dimension of sensor array 302 (e.g., in the y direction), or a diagonal FOV (DFOV) that can be determined based on a diagonal dimension of sensor array 302 in the x-y plane.

As described above, it is desirable that image sensor 300 has a large FOV, such as greater than about ±30°, greater than about ±45°, greater than about ±60°, greater than about ±70°, such that image sensor 300 may capture a larger area and more information of a scene, or may capture light incident on image sensor 300 with a large incident angle. As indicated by equation $$\theta = 2\arctan\left(\frac{h}{2f}\right)$$

described above, for a given size of sensor array 302, the field of view of image sensor 300 may be increased by decreasing the focal length of lens 308. The focal length of lens 308 may be decreased by reducing the radius of the curvature of the lens 308, which may limit the aperture of lens 308 and cause more optical aberrations, and thus may reduce the intensity of the collected light, increase blurriness, and reduce the resolution and the contrast of the captured image.

Figure 4:
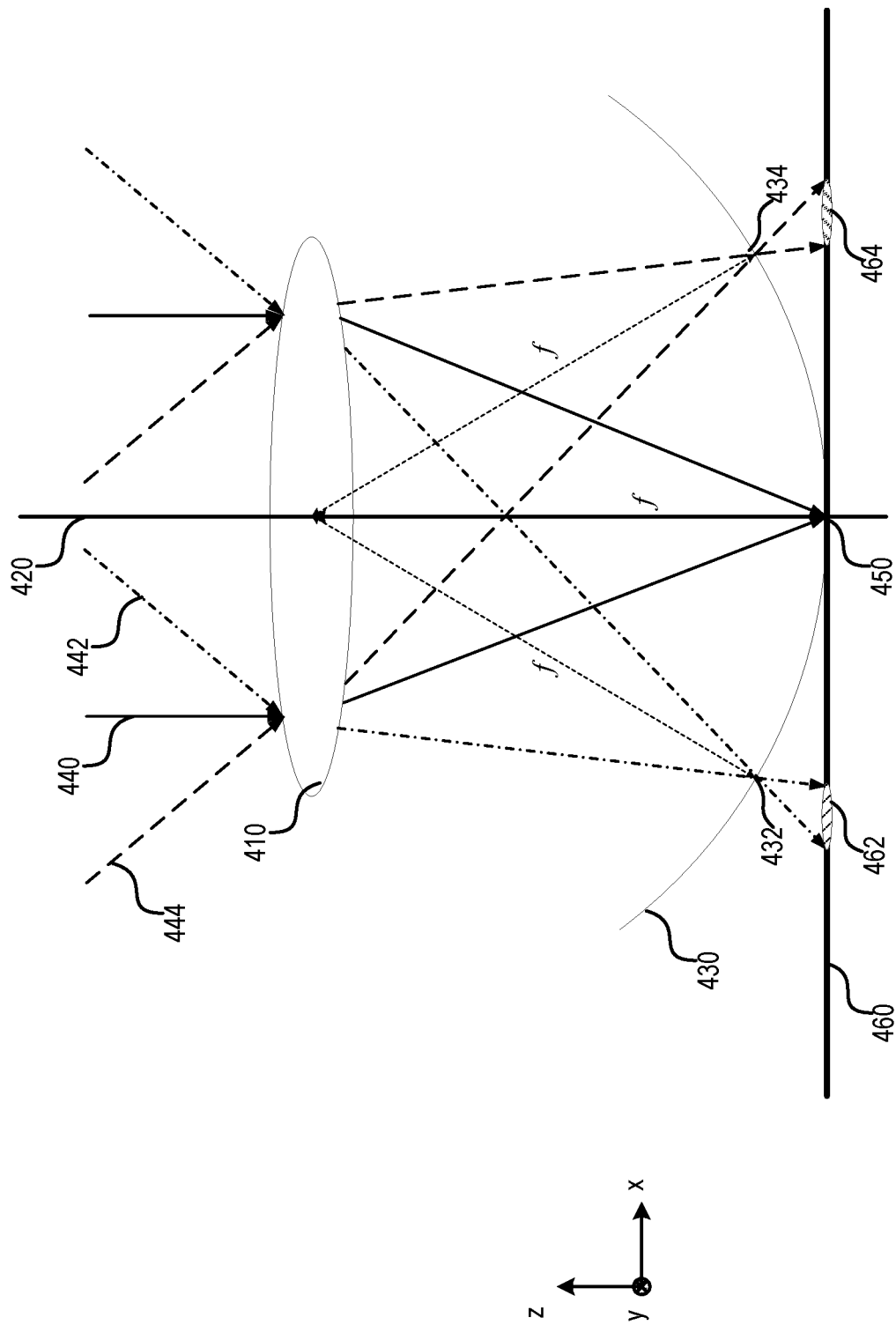
FIG. 4 illustrates an example of an optical aberration caused by the Petzval field curvature.

FIG. 4 illustrates an example of an optical aberration of a lens 410 caused by the Petzval field curvature. Lens 410 may include a spherical lens, an aspherical lens, or a group of spherical and/or aspherical lenses. Petzval field curvature is an optical aberration in which a flat object normal to an optical axis 420 of lens 410 may not be brought into focus properly on a flat image plane because the locus of focal points for the flat object may have a curved shape 430. The locus of focal points of features on the flat object from different field angles may have a semicircle shape in the image space due to the relatively constant focal length f of the lens for light from different field angles. For example, the focal point of light rays 440 from a 0° field of view (e.g., light parallel to optical axis 420) may be at a point 450, which is on optical axis 420 and is at a distance f from the center (or the principal plane) of lens 410. The focal point of light rays 442 from a large positive field angle may be at a point 432, which is not on optical axis 420 and is at a distance f from the center of lens 410. The focal point of light rays 444 from a large negative field angle may be at a point 434, which is not on optical axis 420 and is also at a distance f from the center of lens 410. As such, the focal points of light from different field angles may be approximately on a circle that is centered around the center of lens 410 and has a radius f. This phenomena is referred to as the Petzval field curvature.

Due to the Petzval field curvature, when a flat image sensor 460 is placed at point 450, which is at a distance f from lens 410, image points near optical axis 420 may be in best focus. However, off-axis light rays (e.g., light rays 442 and 444) may come into focus before the image sensor and may be out of focus on the flat image sensor. As such, light rays 442 may be projected onto an area 462, rather than a single point, on image sensor 460. Similarly, light rays 444 may be projected onto an area 464, rather than a single point, on image sensor 460. Thus, the image may be blurry at areas further away from the center. When a flat image sensor is placed at a distance <f from lens 410, image points near optical axis 420 may not be in best focus, while some off-axis light rays may be in best focus on the flat image sensor.

The Petzval field curvature may be less of a problem when the imaging surface is spherical, such as the retina in a human eye, such that the circularly curved shape 430 may overlap with the imaging surface. Therefore, the Petzval field curvature may be accommodated using a curved sensor that has the same or similar curvature as the locus of focal points. For example, film cameras may be able to bend their image planes (the flexible photosensitive films) to reduce the optical aberrations caused by the field curvature, particularly when the focal length of the lens is fixed and known. Digital sensors are difficult to bend, even though experimental products having curved shapes have been produced. However, commonly used image sensor chips, such as most CCD image sensor chips and CMOS image sensor chips are generally planar devices. Therefore, the best focus may only occur in a zone around the intersection points between the image sensor chip and the curved locus of the focal points of the lens. One method to reduce the aberration caused by the field curvature is to insert an aperture stop (e.g., iris) to block edge light rays. This method, however, may greatly decrease the light collecting power and the field of view of the lens.

Figure 5:
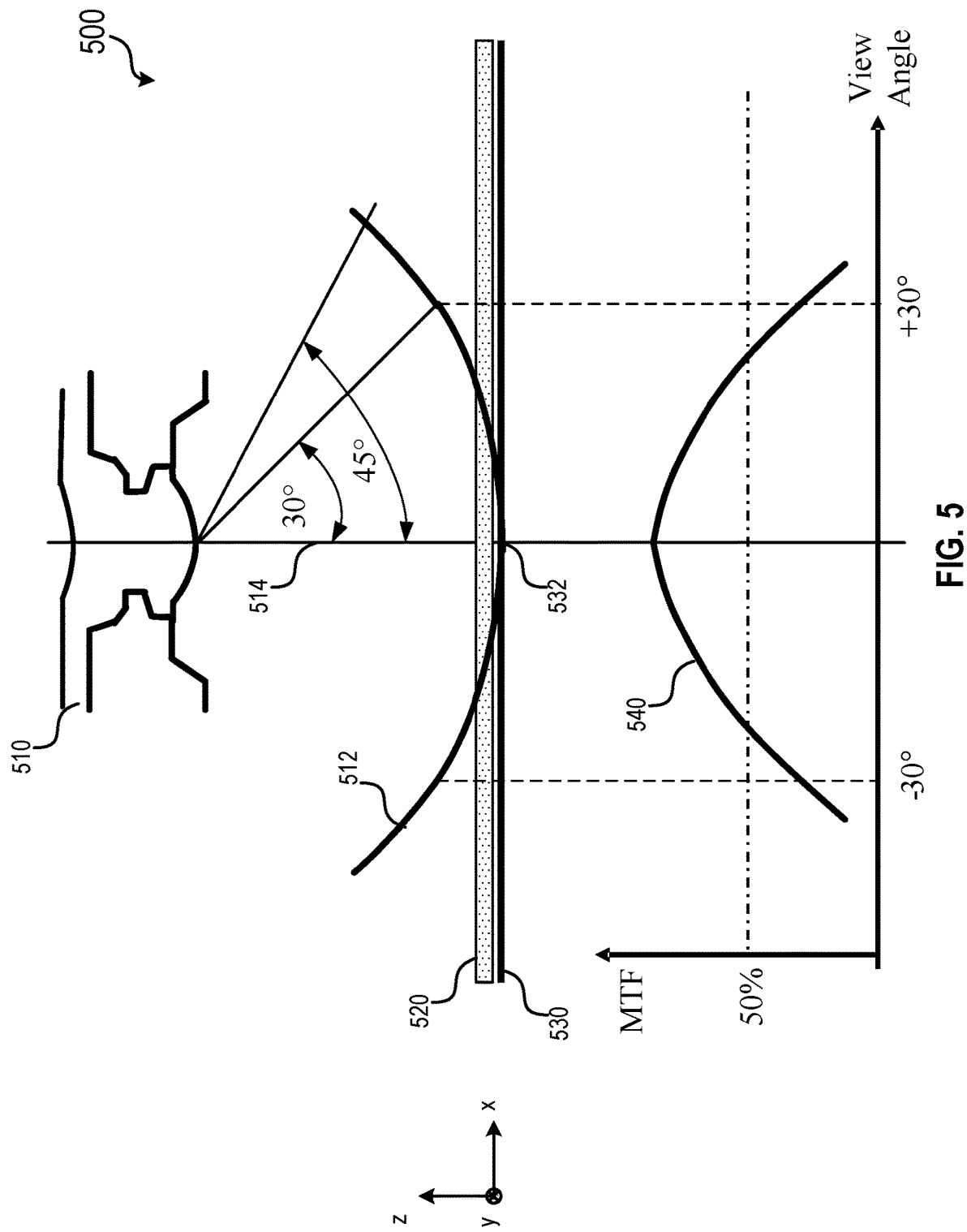
FIG. 5 illustrates an example of an image sensor and the corresponding modulation transfer function (MTF) for different field angles.

FIG. 5 illustrates an example of an image sensor 500 and the corresponding modulation transfer function (MTF) for different field angles. Image sensor 500 may be an example of image sensor 300. In the illustrated example, image sensor 500 includes a lens 510, a flat cover glass 520, and a sensor array 530. Lens 510 may include a single spherical lens, a single aspherical lens, or a group of spherical and/or aspherical lenses. To reduce the size and increase the field of view of image sensor 500, lens 510 may have a very short focal length, such as less than 25 mm, less than 20 mm, less than 10 mm, or less than 5 mm, and thus may have a field curvature with a small radius. The locus of focal points of lens 510 is shown by a curve 512. Cover glass 520 and sensor array 530 are positioned such that sensor array 530 may intersect the locus of focal points of lens 510 at a point 532 on an optical axis 514 of lens 510. Thus, the best resolution is achieved for the zero degree field angle. For features at large field angles, such as from a view angle about 30° or 45°, the focal points may be in front of sensor array 530, and thus may be out of focus on sensor array 530.

A figure of merit that describes how an optical system, such as a camera, projects light from an object or scene onto an image plane (e.g., a film or a sensor array) is the optical transfer function (OTF). The OTF is the Fourier transform of the point spread function (e.g., the image of a point source) of the optical system. The absolute value of the OTF is the MTF, which indicates how well the optical system captures or maintains an object's contrast in the image for features having different spatial frequencies (e.g., numbers of line pairs per millimeter). The contrast for features of a certain spatial frequency can be represented by the modulation depth, which can be calculated as the ratio between the difference of the maximum amplitude (or intensity) and the minimum amplitude and the sum (or average) of the maximum amplitude and the minimum amplitude. Thus, the MTF is a measurement of the ability of the optical system to transfer the contrast (modulation depth) at a particular resolution from the object to the image. The MTF can be calculated as a ratio (referred to as the modulation transfer ratio) between the modulation depth in an image and the modulation depth of the object as a function of the spatial frequency.

FIG. 5 includes a curve 540 illustrating the MTF of image sensor 500 for objects with a certain spatial frequency but at different field angles. Curve 540 shows that the MTF is the highest at a zero degree field angle or on optical axis 514. For image sensor 500 with the single lens 510 and the flat sensor array 530, the MTF may drop quickly as the field angle increases, due to the small radius of the field curvature of lens 510 and thus the large deviation of the focal points from sensor array 530 for off-axis light. As such, image sensor 500 may only achieve a certain desired MTF level (e.g., ≥50%) for a narrow FOV around optical axis 514.

Figure 6A:
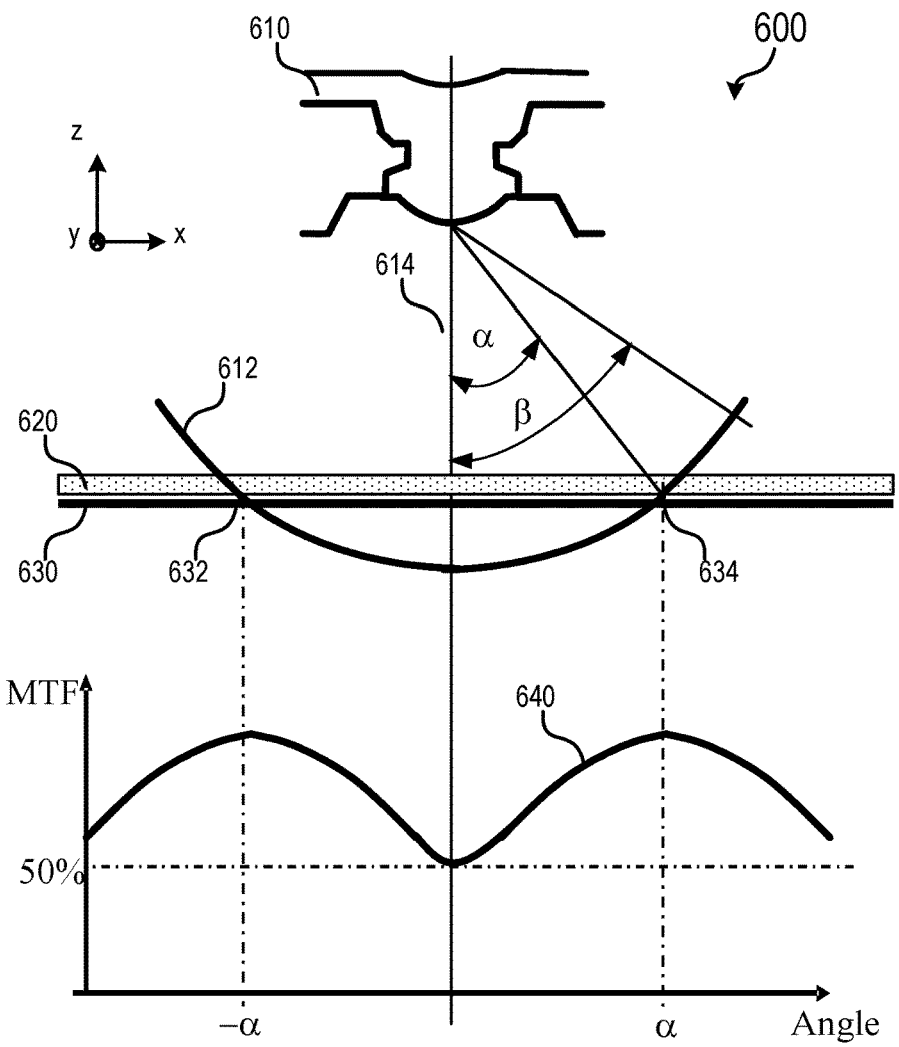
FIG. 6A illustrates another example of an image sensor and the corresponding MTF for different field angles according to certain embodiments.

FIG. 6A illustrates another example of an image sensor 600 and the corresponding MTF for different field angles according to certain embodiments. Image sensor 600 may be an example of image sensor 300. Image sensor 600 may include the same components as image sensor 500, but may have a different arrangement of the component compared with image sensor 500. In the illustrated example, image sensor 600 includes a lens 610, a flat cover glass 620, and a sensor array 630. Lens 610 may include a spherical lens, an aspherical lens, or a group of spherical and/or aspherical lenses. To reduce the size and increase the FOV of image sensor 600, lens 610 may have a very short focal length, such as less than 25 mm, less than 20 mm, less than 10 mm, or less than 5 mm, and thus may have a field curvature with a small radius. The locus of focal points of lens 610 is shown by a curve 612. Cover glass 620 and sensor array 630 are positioned such that sensor array 630 may intersect the locus of focal points of lens 610 at points 632 and 634 that are away from an optical axis 614 of lens 610. Points 632 and 634 may correspond to −α and +α field angles, respectively. Thus, the best resolution is achieved at ±α field angles in a field of view of ±β. In one example, α may be about 30° and β may be about 45°. For features near optical axis 614 (e.g., in the zero degree FOV), the focal points may be behind sensor array 630, and thus may be out of focus on sensor array 630.

FIG. 6A also includes a curve 640 illustrating the MTF of image sensor 600 for objects with a certain spatial frequency but at different field angles. Curve 640 shows that the MTF is the highest for features at ±α (e.g., ±30°) field angles, but may be the lowest for features near or on optical axis 614. For image sensor 600 with the single lens 610 and the flat sensor array 630, the MTF may change quickly as the field angle changes, due to the small radius of the field curvature of lens 610. Due to the positioning of sensor array 630 to intersect the locus of focal points at a large FOV, the minimum MTF in the desired FOV may be increased, compared with image sensor 500. For example, image sensor 600 may be able to achieve a certain desired MTF level (e.g., ≥50%) for an FOV range within about ±β (e.g., ±45°) around optical axis 614.

Figure 6B:
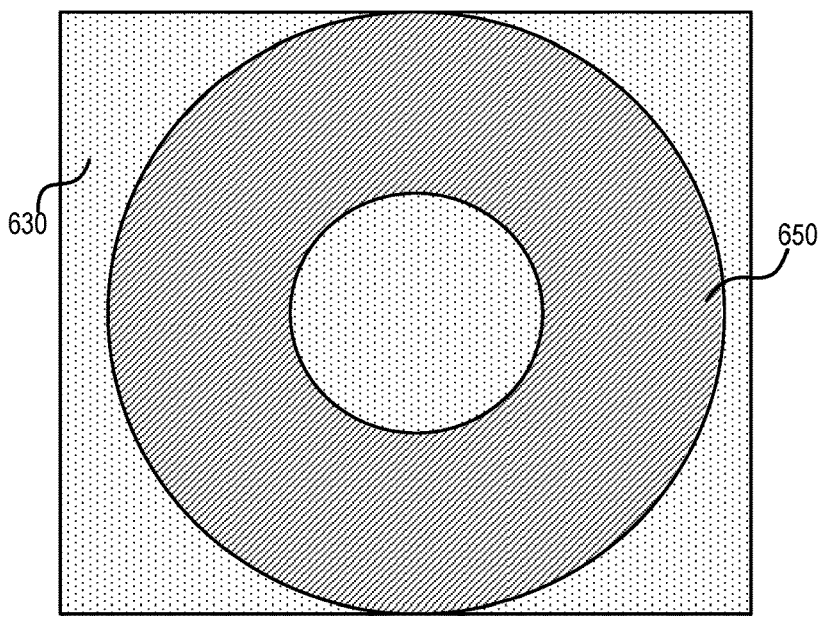
FIG. 6B illustrates the focal zone of the example of the image sensor shown in FIG. 6A according to certain embodiments.

FIG. 6B illustrates a focal zone 650 of the example of image sensor 600 shown in FIG. 6A according to certain embodiments. In the example shown in FIG. 6B, cover glass 620 and sensor array 630 may be positioned with respect to lens 610 such that α may be about, for example, 17.5°, and thus focal zone 650 on sensor array 630 may correspond to field angles in the range of about 10° to 25°. The example of image sensor 600 shown in FIG. 6B may be used in, for example, iris detection and identification. The image of a person's iris may fall within focal zone 650 where the best angular resolution may be achieved. In regions outside of focal zone 650, high angular resolution may not be needed for iris detection and identification. In eye tracking applications, it may be desirable that the angular resolution at large field angles is high, which may be achieved by adjusting the position of sensor array 630 with respect to lens 610 to increase the value of α, such that the image of a person's iris may fall within focal zone 650.

In the examples shown in FIGS. 5 and 6A, the position of the flat sensor array is adjusted to increase the minimum MTF in the FOV, but the Petzval field curvature is not reduced or corrected. A method to accommodate for the Petzval field curvature is adding an additional lens to flatten the curvature of the locus of focal points. As used herein, flattening a curvature refers to reducing the curvature or making the curvature flatter, but does not necessarily mean turning the curvature into a straight line or a flat surface. Many photographic lenses are designed to have a focal length that increases with light incident angle to minimize the field curvature. These photographic lenses generally include a group of lenses in an assembly that may include two or more lenses. Lenses of short focal lengths (e.g., below about 50 mm), such as ultra-wide angle lenses (e.g., fisheye lenses) and wide angle lenses, may suffer more from the Petzval field curvature. Adding additional lenses may reduce the Petzval field curvature to a certain degree, but may also increase the complexity, cost, and size of the image sensor, and thus may be not suitable for use in many low-cost or compact consumer devices, such as mobile phones or tablets.

According to certain embodiments, a cover glass with multiple thickness levels or multiple cover glasses of different sizes may be used to shift the locus of focal points of the lens for larger field angles such that there are multiple intersections between the planar image sensor chip and the locus of focal points of the lens. The cover glass(es) may have a higher thickness in an area farther away from the optical axis. Therefore, for features from a large field angle, the locus of the focal points that may be farther away from the optical axis and may otherwise be away from the image sensor chip due to the Petzval field curvature can be shifted towards the image sensor chip to be better focused on the image sensor chip. As a result, best angular resolution may be achieved at multiple regions of the image sensor chip that correspond to multiple field angle ranges, rather than only achieving the best resolution at a single zone (e.g., at or near the optical axis). The angular resolution at other regions of the image sensor chip corresponding to other field angle ranges may also be improved because the field curvature may be at least partially flattened.

FIG. 7A illustrates an example of an image sensor 700 with multiple cover glasses to form multiple focal zones according to certain embodiments. Image sensor 700 may be another example of image sensor 300. As illustrated, image sensor 700 may include a lens 710, a flat cover glass 720, a flat sensor array 730, and a second cover glass 740. Lens 710 may include a single spherical lens, a single aspherical lens, or a group of spherical and/or aspherical lenses. To reduce the size and increase the FOV of image sensor 700, lens 710 may have a short focal length f, such as less than 25 mm, less than 20 mm, less than 10 mm, or less than 5 mm, and thus may have a field curvature 712 with a small radius. Second cover glass 740 may only cover a portion of cover glass 720, such as areas that are away from an optical axis 714 and correspond to large field angles. As a result, the total thickness of the cover glasses near the periphery of sensor array 730 may be greater than that in the center of sensor array 730.

FIG. 7B illustrates an example of shifting the locus of focal points of a lens using a cover glass 750 according to certain embodiments. As illustrated, a light ray 760 may be incident on cover glass 750 at a certain incident angle that is not zero. Without cover glass 750, light ray 760 may reach a point 772. Due to the higher refractive index of cover glass 750 than air, light ray 760 may be refracted by cover glass, where the refractive angle may be smaller than the incident angle. As such, light ray 760 may be shifted in the −x direction after passing through cover glass 750, and may again propagate at the incident angle to reach a point 770 that is further away from point 772. If the thickness or the refractive index of cover glass 750 is increased, light ray 760 may be further shifted in the −x direction after passing through cover glass 750 and may propagate at the incident angle to reach a point 774 that is farther away form point 772 than point 770. Thus, cover glass 750 may shift the focal point in the −z direction.

As a result, cover glasses 720 and 740 with a higher total thickness near the periphery of sensor array 730 may effectively shift the locus of focal points near the periphery of sensor array 730 further away from lens 710 in the −z direction, thus at least partially flattening field curvature 712. As a result, there may be multiple intersections between the shifted field curvature and sensor array 730, and hence multiple zones of best focus on sensor array 730. For example, when sensor array 730 is placed on optical axis 714 at a distance f from lens 710, a circular zone centered around the optical axis (e.g., for about 0 degree field angle) may have the best focus, and an additional ring-shaped zone for large field angles (e.g., around about ±30°) may also has the best focus. Therefore, image sensor 700 may have the best focus at small view angles and large view angles, without changing the single lens 710 or adding additional lenses.

FIG. 8A illustrates an example of shifting the locus of focal points of a lens 810 using a thin cover glass 820 according to certain embodiments. Lens 810 may include a single spherical lens, a single aspherical lens, or a group of spherical and/or aspherical lenses. As illustrated, without cover glass 820, light rays 812 may be focused to a focal point 830 by lens 810. When thin cover glass 820 is positioned between lens 810 and focal point 830, the actual focal point 840 may be at a location further away from lens 810 than focal point 830 as described above with respect to FIG. 7B.

FIG. 8B illustrates an example of shifting the locus of focal points of lens 810 using a thick cover glass 850 according to certain embodiments. As illustrated, when thick cover glass 850 is positioned between lens 810 and focal point 830, the actual focal point 860 may be at a location further away from lens 810 than focal point 830 as described above with respect to FIG. 7B. Focal point 860 may be further away from lens 810 than focal point 840, for example, by a distance d.

Figure 9A:
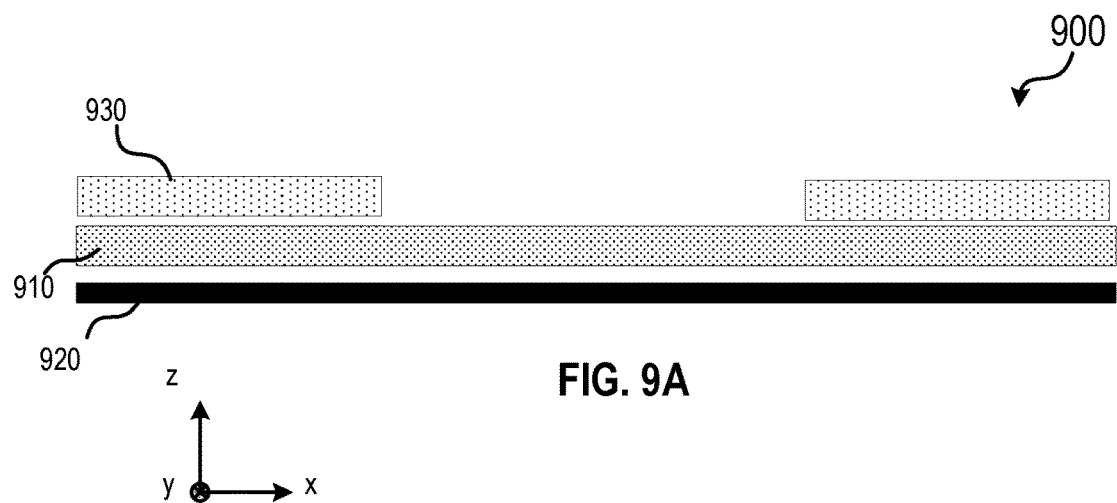
FIG. 9A is a cross-sectional view of an example of an image sensor with multiple cover glasses to form multiple focal zones according to certain embodiments.
Figure 9B:
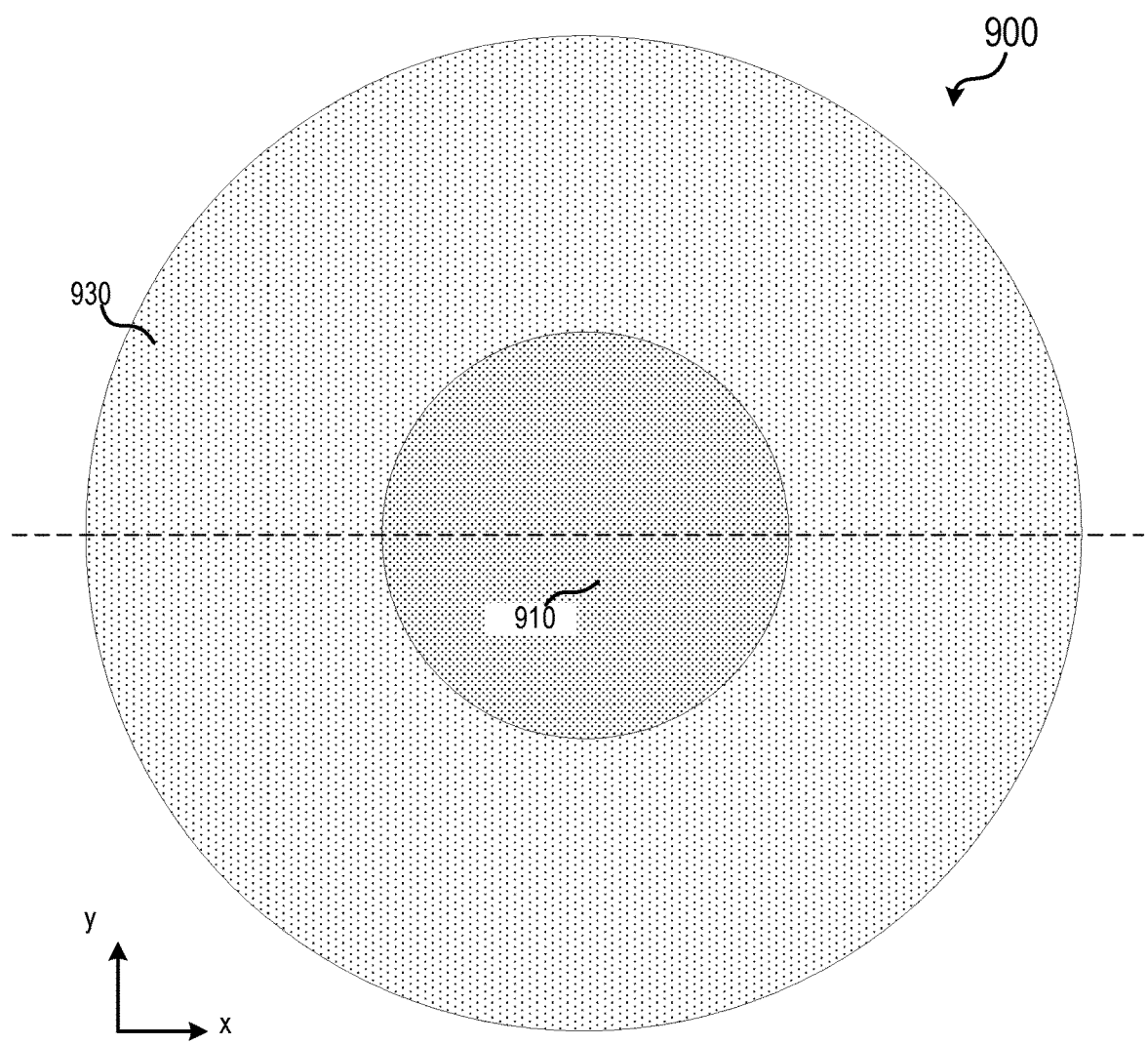
FIG. 9B is a top view of an example of an image sensor with multiple cover glasses to form multiple focal zones according to certain embodiments.

FIG. 9A is a cross-sectional view of an example of an image sensor 900 with multiple cover glasses to form multiple focal zones according to certain embodiments. FIG. 9B is a top view of the example of image sensor 900. Image sensor 900 includes a cover glass 910, a sensor array 920, a cover glass 930, and a lens (e.g., lens 710, not shown in the figures). As described above, sensor array 920 may include an array of photosensors, such as photodiodes, and other circuits that control the operation of the photosensors and read out and process data from the photosensors. For example, sensor array 920 can be a CCD image sensor array or a CMOS image sensor array.

Cover glass 910 and cover glass 930 may each be a flat plate of a material transparent to the working wavelength of sensor array 920, such as visible light or infrared light. For example, cover glass 910 and cover glass 930 may include glass, quartz, plastic materials, polycarbonate, polyurethane, and the like. Cover glass 910 and cover glass 930 may each have a high refractive index, such as greater than about 1.45, about 1.5, about 1.6, or higher. Cover glass 910 and cover glass 930 may or may not have the same refractive index. Cover glass 910 may cover the top surface of sensor array 920, while cover glass 930 may only cover portions of cover glass 910, such as the peripheral regions of cover glass 910. For example, as shown in FIG. 9B, cover glass 930 may have a ring shape. Cover glass 910 and cover glass 930 may each have a respective thickness so as to shift the focal points by desired distances as described above with respect to FIGS. 7A-8B. In one example, the thickness of each of cover glass 910 and cover glass 930 may be about 400 μm. As described above, cover glass 910 may also be an optical filter.

FIG. 10A illustrates an example of an image sensor 1000 with multiple cover glasses according to certain embodiments. Image sensor 1000 may be similar to image sensor 700. As illustrated, image sensor 1000 may include a lens 1010, a flat cover glass 1020, a flat sensor array 1030, and a second cover glass 1040. Lens 1010 may include a single spherical lens, a single aspherical lens, or a group of spherical and/or aspherical lenses. Lens 1010 may have a large FOV and a short focal length f, such as less than 25 mm, less than 20 mm, less than 10 mm, or less than 5 mm, and thus may have a field curvature with a small radius. Second cover glass 1040 may only cover the peripheral regions of cover glass 1020 that may correspond to large field angles, such as greater than about 15°, for example, between about 20° and about 45° as shown in the example in FIG. 10A. As a result, the total thickness of the cover glasses near the periphery of sensor array 1030 may be greater than that in the center of sensor array 1030.

In the illustrated example, the center region of the field curvature of image sensor 1000 is shown by a curve 1012. Sensor array 1030 may be placed such that it may intersect the field curvature of image sensor 1000 at the optical axis of lens 1010 as shown by a point 1034 on sensor array 1030. Cover glass 1020 and the additional second cover glass 1040 may be configured to shift the locus of focal points for features at large field angles in the −z direction as shown by a curve 1014 and a curve 1016, such that the shifted locus of focal points may also intersect sensor array 1030 at points 1032 and 1036.

FIG. 10B illustrates the MTF for different field angles of the example of image sensor 1000 shown in FIG. 10A according to certain embodiments. In FIG. 10B, a curve 1050 illustrates the MTF of image sensor 1000 for objects with a certain spatial frequency but at different field angles. Curve 1050 shows that, due to the shifting of the locus of focal points for large field angles, the MTF is the highest for features at 0° and about ±35° field angles, which correspond to the intersect points (e.g., points 1034, 1032, and 1034) of the shifted locus of focal points and sensor array 1030. Therefore, multiple regions on sensor array 1030 may have high MTF values, such as greater than about 80% or greater than about 90%. In addition, due to the partial flattening of the field curve, the range of the focal points in the z direction may be reduced, and thus the minimum MTF in the desired FOV (e.g., within about ±45°) may be increased, compared with image sensor 500 or 600. For example, image sensor 1000 may be able to achieve a high MTF level (e.g., ≥about 70%) for an FOV within about ±45° around the optical axis.

FIG. 10C illustrates the focal zones of the example of image sensor 1000 that have high MTF levels, such as greater than about 80% or greater than about 90%. As illustrated, image sensor 1000 may have a circular focal zone 1060 at the center of sensor array 1030 and a ring-shaped focal zone 1062 that is away from the center of sensor array 1030.

Figure 11:
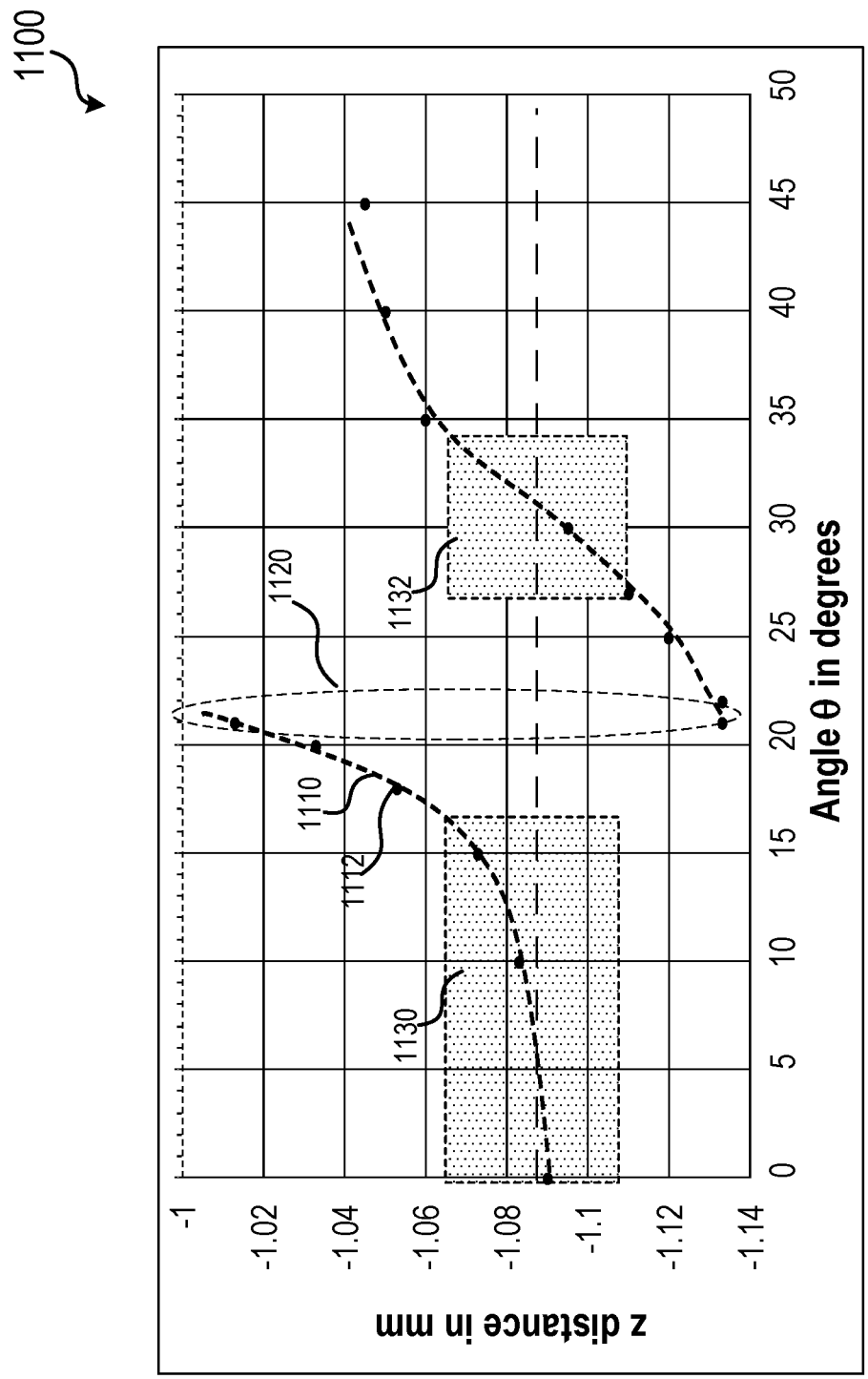
FIG. 11 illustrates the simulated locus of focal points of an image sensor shifted by a cover glass according to certain embodiments.

FIG. 11 includes a plot 1100 illustrating the simulated locus of focal points of an image sensor shifted by one or more cover glasses according to certain embodiments. The image sensor may include a stack of two cover glasses having different sizes or a cover glass with two different thickness levels, as shown in, for example, image sensor 700 of FIG. 7A, image sensor 900 of FIG. 9A, or image sensor 1000 of FIG. 10A. for example, a second cover glass may only be positioned on regions of the sensor array corresponding to field angles greater than 20° and less than −20°.

Plot 1100 shows a curve 1110 formed by simulated focal points 1112 as a function of the view angle or field angle. Curve 1110 has a discontinuity region 1120 at about 21 to 22 degrees. For many computer vision applications, this known discontinuity at known view angles (or known locations in the image) can be counted for during image processing, and thus may not be detrimental. The shift of the locus of focal points for large view angles due to the refraction of light by the thicker cover glass described above causes multiple intersections between the planar sensor array and the locus of focal points that are partially shifted and thus partially flattened. For example, plot 1100 shows two focal zones 1130 and 1132 in which the MTF may be high and the images may be better focused such that the contrast of the object may be better preserved.

The locus of focal points of an image sensor may be shifted by cover glasses having other configurations to provide different optical path lengths (OPLs) at different regions. For example, as described above, the cover glass can be a cover glass with two or more levels of thickness, such as 2, 3, 4, 5, 6, 8, or more thickness levels, but less than a threshold number of levels (e.g., less than 16, 12, or 10 levels) such that the cover glass can still be relative easy to manufacture and assemble and can still has a small size and a low cost. The number of levels may be determined based on the field curvature of the lens, the FOV, and the desired MTF values in the FOV. In some embodiments, the image sensor may include a stack of two or more cover glasses with different sizes, such as increasing or decreasing sizes, to form a combined cover glass with two or more different thickness levels. In some embodiments, the cover glass may have different refractive indices, in addition to or as an alternative to different thicknesses, at different regions. In various embodiments, the cover glass may have any desired shapes, such as a squares, a rectangles, a circle, an oval, a circular ring, a rectangle or square ring, and the like. In some embodiments, the edges of the cover glass may be tapered.

Figure 12A:
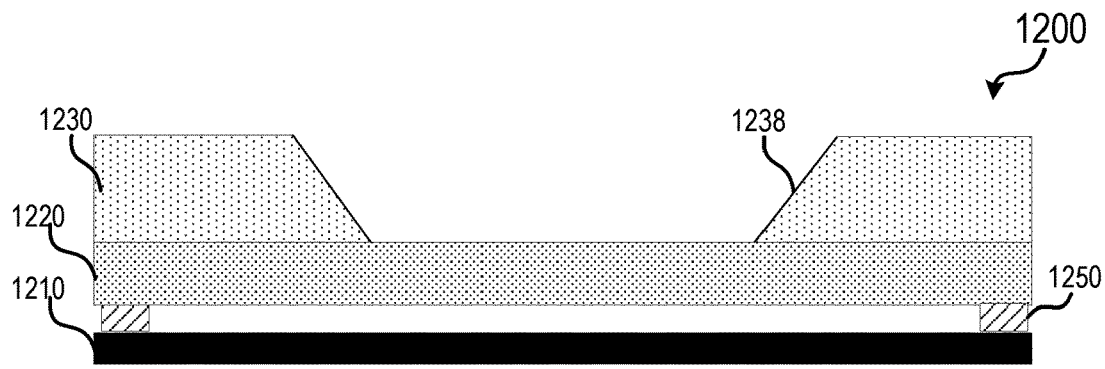
FIG. 12A illustrates an example of an image sensor including multiple cover glasses according to certain embodiments.

FIG. 12A illustrates an example of an image sensor 1200 including multiple cover glasses according to certain embodiments. As with image sensor 700, 900, or 1000, image sensor 1200 may include a sensor array 1210, a first cover glass 1220, a second cover glass 1230, and a lens (such as lens 1010, not shown in FIG. 12A). Sensor array 1210 may be flat and may be similar to sensor arrays 730, 920, and 1030 described above. First cover glass 1220 and second cover glass 1230 may be planar glass plates and may be positioned on top of sensor array 1210 to form a stack.

First cover glass 1220 may be positioned on sensor array 1210 through, for example, a spacer 1250. The thickness of spacer 1250 may be selected to position first cover glass 1220 at a desired distance from sensor array 1210. First cover glass 1220 may be similar to cover glass 312, 520, 620, 720, 910, or 1020 described above. In some embodiments, first cover glass may also be an optical filter. Second cover glass 1230 may include a material same as the material of first cover glass 1220 or different from the material of first cover glass 1220. As described above, first cover glass 1220 and second cover glass 12330 may include glass, quartz, plastic materials, polycarbonate, polyurethane, or any other solid material transparent to light that can be detected by sensor array 1210. First cover glass 1220 and second cover glass 1230 may each have a high refractive index, such as greater than about 1.45, about 1.5, about 1.6, or higher.

First cover glass 1220 may have any suitable thickness. Second cover glass 1230 may have an appropriate thickness and shape for shifting the focal points by desired distances in a desired region. Second cover glass 1230 may have an area smaller than the area of first cover glass 1220, such as a ring-shaped area that has an aperture in the center. In the example shown in FIG. 12A, the inner edges 1238 of second cover glass 1230 may be tapered, such that the reflection by inner edges 1238 may be reduced.

Figure 12B:
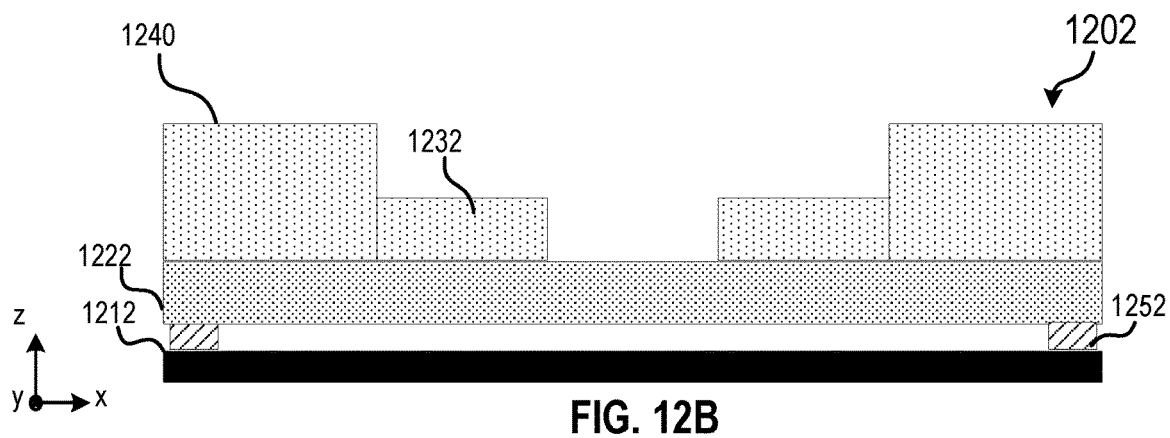
FIG. 12B illustrates an example of an image sensor including multiple cover glasses according to certain embodiments.

FIG. 12B illustrates an example of an image sensor 1202 including multiple cover glasses according to certain embodiments. Image sensor 1202 may include a sensor array 1212, a first cover glass 1222, a second cover glass 1232, a third cover glass 1240, and a lens (such as lens 1010, not shown in FIG. 12B). Sensor array 1212 may be flat and may be similar to sensor arrays 730, 920, and 1030 described above. First cover glass 1222 may be positioned on sensor array 1212 through, for example, a spacer 1252. The thickness of spacer 1252 may be selected to position first cover glass 1222 at a desired distance from sensor array 1212. Second cover glass 1232 and third cover glass 1240 may have different thicknesses and/or refractive indices and may be positioned on different areas of first cover glass 1222.

First cover glass 1222 may include a planar glass plate that covers sensor array 1212. First cover glass 1220 may be similar to cover glass 312, 520, 620, 720, 910, or 1020 described above. In some embodiments, first cover glass may also be an optical filter. First cover glass 1222, second cover glass 1232, and third cover glass 1240 may include a same material or different materials. For example, first cover glass 1222, second cover glass 1232, and third cover glass 1240 may each include glass, quartz, plastic materials, polycarbonate, polyurethane, or any other solid material transparent to light that can be detected by sensor array 1212. First cover glass 1222, second cover glass 1232, and third cover glass 1240 may each have a high refractive index, such as greater than about 1.45, about 1.5, about 1.6, or higher.

First cover glass 1222 may have any suitable thickness. Second cover glass 1232 and third cover glass 1240 may each have an appropriate thickness and/or refractive index for shifting the focal points by desired distances. In the example shown in FIG. 12B, second cover glass 1232 may have an area smaller than the area of first cover glass 1222, such as a ring-shaped area that has an aperture in the center. Third cover glass 1240 may also have a ring-shaped area that has an aperture in the center, where second cover glass 1232 may be positioned in the aperture of third cover glass 1240. Third cover glass 1240 may be thicker than second cover glass 1232 to provide a longer shift of the focal points for large field angles.

Figure 12C:
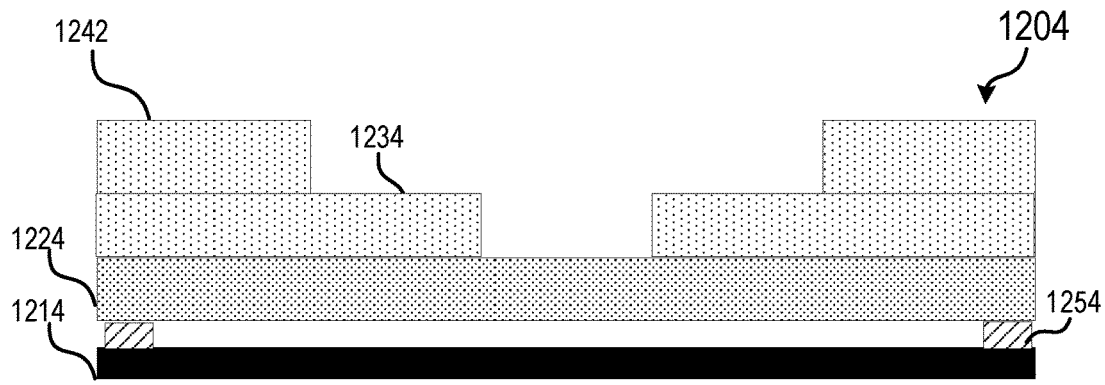
FIG. 12C illustrates an example of an image sensor including multiple cover glasses according to certain embodiments.

FIG. 12C illustrates another example of an image sensor 1204 including multiple cover glasses according to certain embodiments. Image sensor 1204 may include a sensor array 1214, a first cover glass 1224, a second cover glass 1234, a third cover glass 1242, and a lens (such as lens 1010, not shown in FIG. 12C). Sensor array 1214 may be flat and may be similar to sensor arrays 730, 920, and 1030 described above. First cover glass 1224 may be positioned on sensor array 1214 through, for example, a spacer 1254. The thickness of spacer 1254 may be selected to position first cover glass 1224 at a desired distance from sensor array 1214. Second cover glass 1234 may be placed on top of an area of first cover glass 1224. Third cover glass 1242 may be positioned on top of an area of second cover glass 1234.

First cover glass 1224 may include a planar glass plate that covers sensor array 1214. First cover glass 1224 may be similar to cover glass 312, 520, 620, 720, 910, or 1020 described above. In some embodiments, first cover glass may also be an optical filter. First cover glass 1224, second cover glass 1234, and third cover glass 1242 may include a same material or different materials. For example, first cover glass 1224, second cover glass 1234, and third cover glass 1242 may each include glass, quartz, plastic materials, polycarbonate, polyurethane, or any other solid material transparent to light that can be detected by sensor array 1214. First cover glass 1224, second cover glass 1234, and third cover glass 1242 may each have a high refractive index, such as greater than about 1.45, about 1.5, about 1.6, or higher.

First cover glass 1224 may have any suitable thickness. Second cover glass 1234 and third cover glass 1240 may each have an appropriate thickness and/or refractive index for shifting the focal points by desired distances. In the example shown in FIG. 12C, second cover glass 1234 may have an area smaller than the area of first cover glass 1224, such as a ring-shaped area that has an aperture in the center. Third cover glass 1242 may be on top of second cover glass 1234 and may also have a ring-shaped area that has an aperture in the center, where the area of third cover glass 1242 may be smaller than the area of second cover glass 1234 to provide different OPLs at different regions.

Figure 12D:
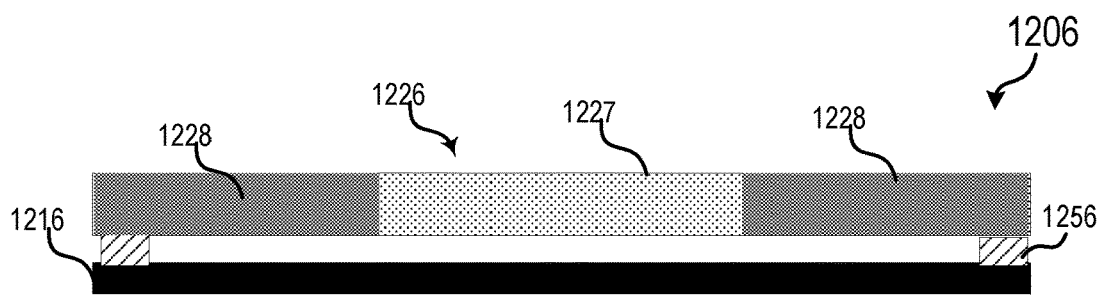
FIG. 12D illustrates an example of an image sensor including a cover glass according to certain embodiments.

FIG. 12D illustrates an example of an image sensor 1206 including a cover glass 1226 according to certain embodiments. Image sensor 1206 may include a sensor array 1216, cover glass 1226, and a lens (such as lens 1010, not shown in FIG. 12D). Sensor array 1216 may be flat and may be similar to sensor arrays 730, 920, and 1030 described above. Cover glass 1226 may be positioned on sensor array 1214 through, for example, a spacer 1256. The thickness of spacer 1256 may be selected to position cover glass 1226 at a desired distance from sensor array 1216. Cover glass 1226 may include a first region 1227 and a second region 1228. First region 1227 and second region 1228 may have different refractive indices and/or different thicknesses to provide different optical path lengths. In the example shown in FIG. 12D, cover glass 1226 includes a planar plate that includes glass, quartz, plastic materials, polycarbonate, polyurethane, or any other solid material transparent to light that can be detected by sensor array 1216. First region 1227 may be on a center region of sensor array 1216. Second region 1228 may be on a peripheral region of sensor array 1216. Second region 1228 may have a higher refractive index than first region 1227 to shift the focal points away from the lens of image sensor 1206.

It is noted that the embodiments of image sensors described above are for illustration purposes only. Other configurations and arrangements of the cover glass(es) may be used to provide different OPLs at different regions to shift the locus of focal points of an image sensor.

According to one or more aspects, any and/or all of the apparatus, modules, systems, image sensors, circuitry, methods, and/or method steps described in FIGS. 1-12D herein may be implemented by and/or in an electrical circuit or a computing device. Additionally or alternatively, any and/or all of the methods and/or method steps described herein may be implemented in computer-readable instructions, such as computer-readable instructions stored on a computer-readable medium, such as memory, storage or another computer-readable medium.

Figure 13:
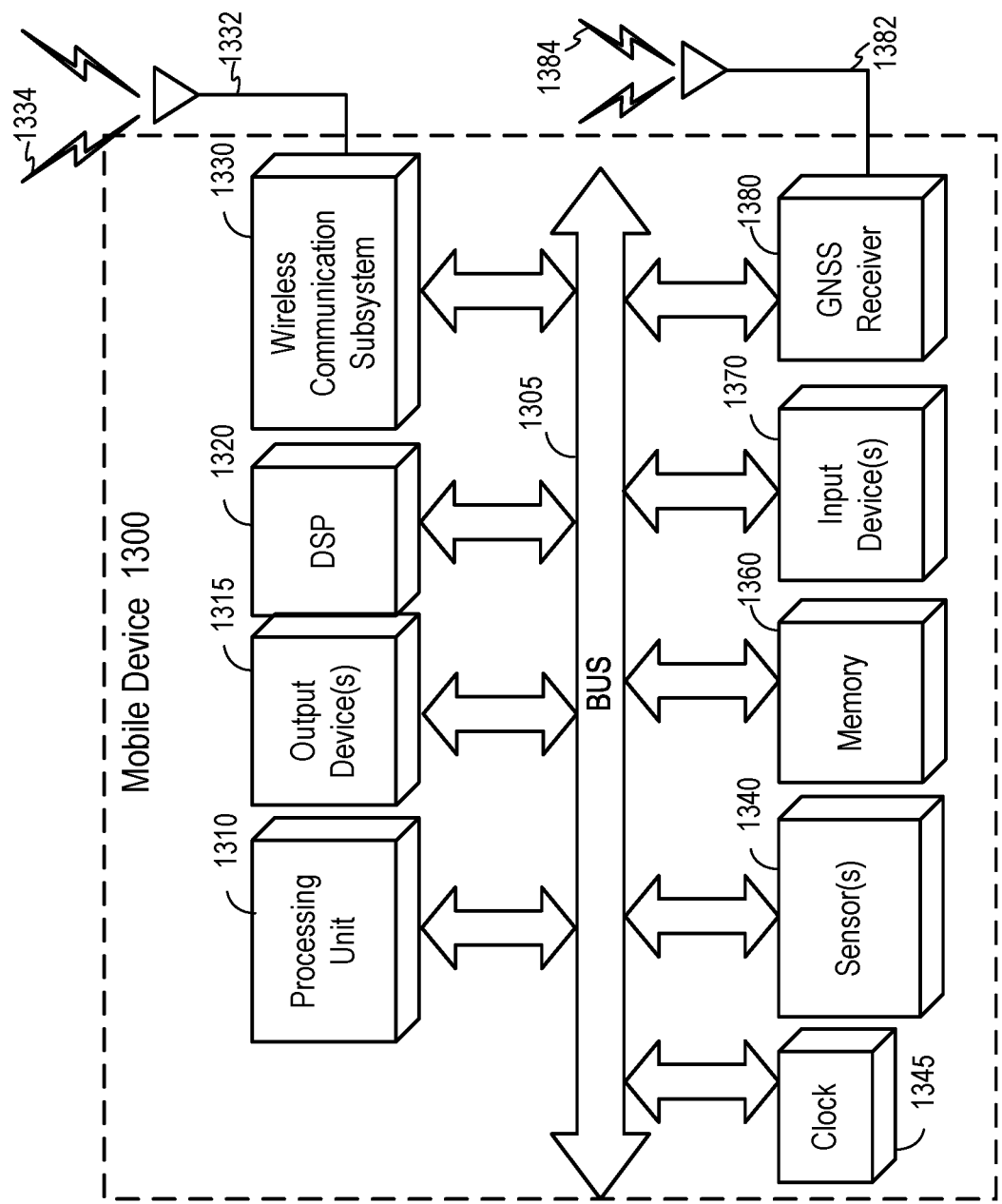
FIG. 13 is a block diagram of an example of a mobile device for implementing some of the embodiments described herein.

FIG. 13 illustrates an embodiment of a mobile device 1300 for implementing some of the embodiments described herein. For example, mobile device 1300 can be used in mobile device 105, or can be used to perform at least some operations described above. It should be noted that FIG. 13 is meant only to provide a generalized illustration of various components, any or all of which may be utilized as appropriate.

Mobile device 1300 is shown comprising hardware elements that can be electrically coupled via a bus 1305 (or may otherwise be in communication, as appropriate). The hardware elements may include a processing unit(s) 1310 which can include without limitation one or more general-purpose processors, one or more special-purpose processors (such as digital signal processing chips, graphics acceleration processors, application-specific integrated circuits (ASICs), and/or the like), and/or other processing structure or means, which can be configured to perform one or more of the methods described herein. As shown in FIG. 13, some embodiments may have a separate digital signal processor (DSP) 1320, depending on the desired functionality. Mobile device 1300 also can include one or more input devices 1370, which can include without limitation a touch pad, button(s), dial(s), switch(es), and/or the like; and one or more output devices 1315, which can include without limitation light emitting diodes (LEDs), speakers, and/or the like. For example, the LEDs may be used to transmit VLC signals.

Mobile device 1300 might also include a wireless communication subsystem 1330, which can include without limitation a wireless communication device, and/or a chipset (such as a Bluetooth device, an International Electrical and Electronics Engineers (IEEE) 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 1330 may permit data to be exchanged with a network, wireless access points, other computer systems, and/or any other electronic devices described herein, such as a mobile device or a remote controller. The communication can be carried out via one or more wireless communication antenna(s) 1332 that send and/or receive wireless signals 1334.

Depending on the desired functionality, wireless communication subsystem 1330 can include a separate transmitter and receiver, or any combination of transceivers, transmitters, and/or receivers to communicate with base stations (e.g., ng-eNBs and gNBs) and other terrestrial transceivers, such as wireless devices and access points. Mobile device 1300 may communicate with different data networks that may comprise various network types. For example, a Wireless Wide Area Network (WWAN) may be a code division multiple access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more Radio Access Technologies (RATs), such as CDMA2000, Wideband CDMA (WCDMA), and so on. CDMA2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long-Term Evolution (LTE), LTE Advanced, 5G New Radio (NR), and so on. 5G NR, LTE, LTE Advanced, GSM, and WCDMA are described in documents from the 3rd Generation Partnership Project (3GPP). CDMA2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN, and/or WPAN.

Mobile device 1300 may include a clock 1345 on bus 1305, which can generate a signal to synchronize various components on bus 1305. Clock 1345 may include an inductor-capacitor (LC) oscillator, a crystal oscillator, a ring oscillator, a digital clock generator (e.g., a clock divider or a clock multiplexer), a phase locked loop, or other clock generators. Clock 1345 may be synchronized (or substantially synchronized) with corresponding clocks on other wireless devices for data communication. Clock 1345 may be driven by wireless communication subsystem 1330, which may be used to synchronize clock 1345 of mobile device 1300 to one or more other devices. Clock 1345 may be used as the time base or reference for synchronizing different components of mobile device 1300.

Mobile device 1300 can further include sensor(s) 1340. Such sensors can include, without limitation, one or more acoustic sensor(s), accelerometer(s), gyroscope(s), camera(s), magnetometer(s), altimeter(s), microphone(s), proximity sensor(s), light sensor(s), and the like. Some or all of sensor(s) 1340 can be utilized, among other things, for light signal detection, motion detection, and positioning.

Embodiments of the mobile device may also include a Global Navigation Satellite System (GNSS) receiver 1380 capable of receiving signals 1384 from one or more GNSS satellites using a GNSS antenna 1382. Positioning based on GNSS signal measurement can be utilized to complement and/or incorporate the techniques described herein. The GNSS receiver 1380 can extract a position of the mobile device 1300, using conventional techniques, from GNSS space vehicles (SVs) of a GNSS system, such as Global Positioning System (GPS), Galileo, Globalnaya Navigazionnaya Sputnikovaya Sistema (GLONASS), Quasi-Zenith Satellite System (QZSS) over Japan, Indian Regional Navigational Satellite System (IRNSS) over India, BeiDou Navigation Satellite System (BDS) over China, and/or the like. Moreover, GNSS receiver 1380 can be used with various augmentation systems (e.g., a Satellite-Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

Mobile device 1300 may further include and/or be in communication with a memory 1360. Memory 1360 may include any non-transitory storage device, and may include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like. For instance, memory 1360 may include a database (or other data structure) configured to store information such as the captured image data.

Memory 1360 of mobile device 1300 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions that can be stored or loaded in memory 1360 and be executed by mobile device 1300, a processing unit within mobile device 1300, and/or another device of a wireless system. In an aspect, such code and/or instructions can be used to configure and/or adapt a general-purpose computer (or other devices) to perform one or more operations in accordance with the described methods.

Figure 14:
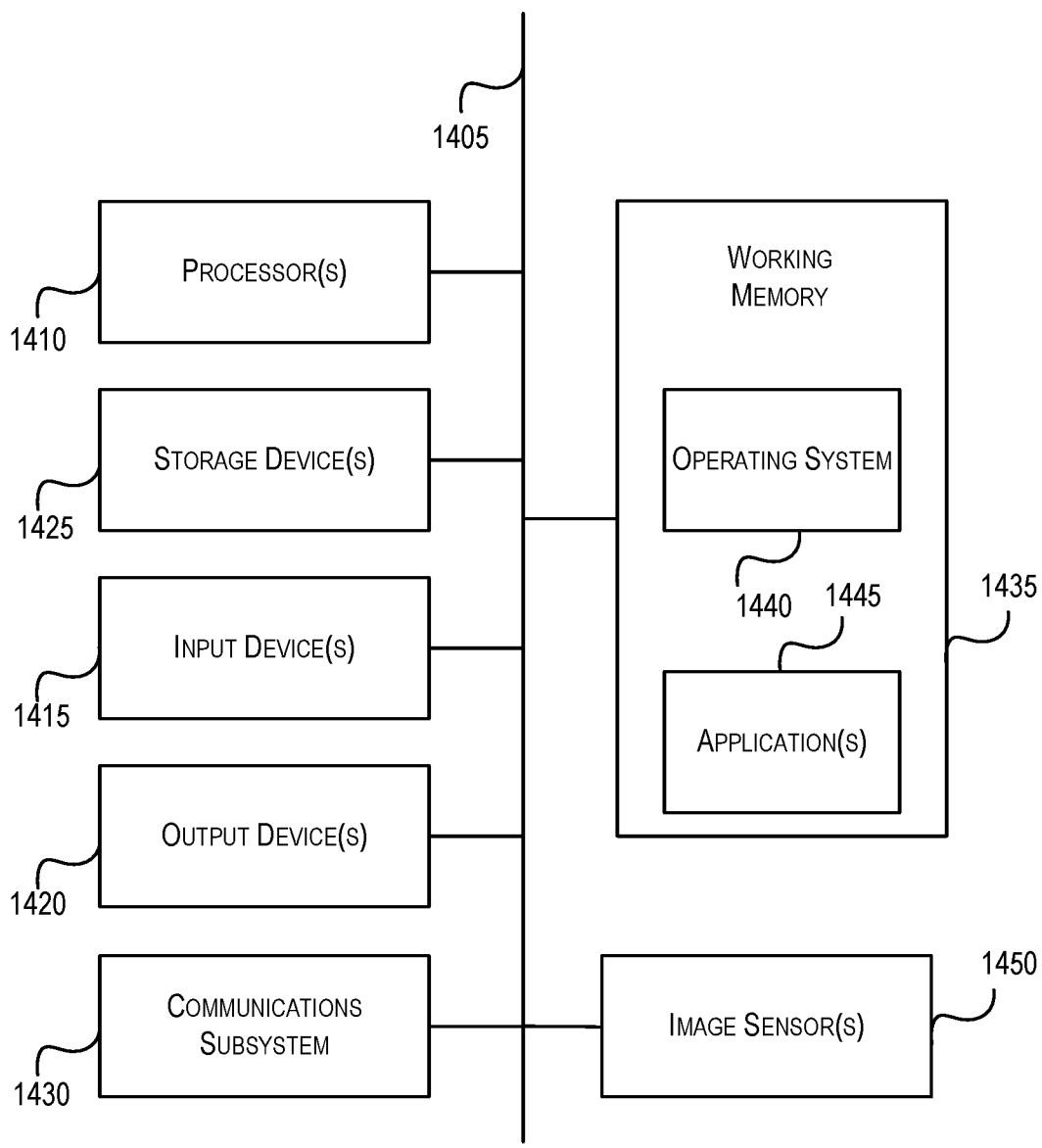
FIG. 14 is a block diagram of an example of a computing device for implementing some of the embodiments described herein.

FIG. 14 illustrates an example of a computing device 1400 for implementing some of the embodiments described herein. For example, computing device 1400 may represent some of the components of a mobile device or any other computing device. Examples of computing device 1400 include, but are not limited to, desktops, workstations, personal computers, supercomputers, video game consoles, tablets, smart phones, laptops, netbooks, or other portable devices. For example, computing device 1400 may be used to implement computer vision system 200. FIG. 14 provides a schematic illustration of one embodiment of computing device 1400 that may perform the methods provided by various other embodiments, as described herein, and/or may function as the host computing device, a remote kiosk/terminal, a point-of-sale device, a mobile multifunction device, a set-top box and/or a computing device. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

Computing device 1400 is shown comprising hardware elements that may be electrically coupled via a bus 1405 (or may otherwise be in communication, as appropriate). The hardware elements may include one or more processors 1410, including, without limitation, one or more general-purpose processors and/or one or more special-purpose processors (such as digital signal processing chips, graphics acceleration processors, and/or the like); one or more input devices 1415, which may include, without limitation, one or more sensors 1450, a touch screen, a mouse, a keyboard and/or the like; and one or more output devices 1420, which may include, without limitation, a display unit, a printer and/or the like. Sensors 1450 may include image/vision sensors, olfactory sensors and/or chemical sensors.

Computing device 1400 may further include (and/or be in communication with) one or more non-transitory storage devices 1425, which may comprise, without limitation, local and/or network accessible storage, and/or may include, without limitation, a disk drive, a drive array, an optical storage device, a solid-form storage device such as a RAM and/or a read-only memory (ROM), which may be programmable, flash-updateable and/or the like. Such storage devices may be configured to implement any appropriate data storage, including, without limitation, various file systems, database structures, and/or the like.

Computing device 1400 may also include a communications subsystem 1430. Communications subsystem 1430 may include a transceiver for receiving and transmitting data or a wired and/or wireless medium. Communications subsystem 1430 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. Communications subsystem 1430 may permit data to be exchanged with a network, other computing devices, and/or any other devices described herein. In many embodiments, computing device 1400 may further comprise a non-transitory working memory 1435, which may include a RAM or ROM device, as described above.

Computing device 1400 may comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer), such as the example method illustrated in FIG. 11; in an aspect, then, such code and/or instructions may be used to configure and/or adapt a general-purpose computer (or other device) to perform one or more operations in accordance with the described methods.

A set of these instructions and/or code might be stored on a computer-readable storage medium, such as storage device(s) 1425 described above. In some cases, the storage medium might be incorporated within a computing device, such as computing device 1400. In other embodiments, the storage medium might be separate from a computing device (e.g., a removable medium, such as a compact disc), and/or provided in an installation package, such that the storage medium may be used to program, configure and/or adapt a general-purpose computer with the instructions/code stored thereon. These instructions might take the form of executable code, which is executable by computing device 1400 and/or might take the form of source and/or installable code, which, upon compilation and/or installation on computing device 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1400 such as network input/output devices may be employed.

Some embodiments may employ a computing device (such as computing device 1400) to perform methods in accordance with the disclosure. For example, some or all of the procedures of the described methods may be performed by computing device 1400 in response to processor 1410 executing one or more sequences of one or more instructions (which might be incorporated into operating system 1440 and/or other code, such as an application program 1445) contained in working memory 1435. Such instructions may be read into working memory 1435 from another computer-readable medium, such as one or more storage device(s) 1425. Merely by way of example, execution of the sequences of instructions contained in working memory 1435 might cause processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using computing device 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as storage device(s) 1425. Volatile media include, without limitation, dynamic memory, such as working memory 1435. Transmission media include, without limitation, coaxial cables, copper wire, and fiber optics, including the wires comprising the bus 1405, as well as the various components of communications subsystem 1430 (and/or the media by which communications subsystem 1430 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in the analog domain.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Common forms of physical and/or tangible computer-readable media include, for example, a floppy disk, a flexible disk, hard disk, magnetic tape, or any other magnetic medium, a compact disc read-only memory (CD-ROM), any other optical medium, punch cards, paper tape, any other physical medium with patterns of holes, a RAM, a PROM, an erasable programmable read-only memory (EPROM), a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1400. These signals, which might be in the form of electromagnetic signals, acoustic signals, optical signals and/or the like, are all examples of carrier waves on which instructions may be encoded, in accordance with various embodiments of the invention.

Communications subsystem 1430 (and/or components thereof) generally will receive the signals, and bus 1405 then might carry the signals (and/or the data, instructions, etc., carried by the signals) to working memory 1435, from which processor(s) 1410 retrieves and executes the instructions. The instructions received by working memory 1435 may optionally be stored on a non-transitory storage device 1425 either before or after execution by processor(s) 1410.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or a similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of the claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or a similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. The memory may be implemented within the processor unit or external to the processor unit. As used herein the term "memory" refers to any type of long term, short term, volatile, nonvolatile, or other memory and is not to be limited to any particular type of memory, any particular number of memory devices, or any particular type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, electrically erasable programmable read-only memory (EEPROM), CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on a computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At the first time, the transmission media included in the communication apparatus may include a first portion of the information to perform the disclosed functions, while at a second time the transmission media included in the communication apparatus may include a second portion of the information to perform the disclosed functions.

What is claimed is:

1. An image sensor comprising:
   a planar sensor array;
   a lens configured to form an optical image on the planar sensor array, wherein a locus of focal points of the lens is on a curved surface;
   a first planar cover glass on the planar sensor array; and
   a second cover glass on a first area of the first planar cover glass and configured to shift a first portion of the locus of focal points of the lens such that a middle region of the first portion of the locus of focal points intersects the planar sensor array at one or more points and peripheral regions of the first portion of the locus of focal points do not intersect the planar sensor array,
   wherein the second cover glass is a planar cover glass or includes a plurality of flat steps characterized by discrete thickness levels; and
   wherein at least two points of the first portion of the locus of focal points on opposite sides of an intersect point of the first portion of the locus of focal points and the planar sensor array are on opposite sides of the planar sensor array.

2. The image sensor of claim 1, wherein a focal length of the lens and a linear dimension of the planar sensor array are selected such that the image sensor is characterized by a field of view greater than ±30°.

3. The image sensor of claim 1, wherein the planar sensor array is positioned to intersects a second portion of the locus of focal points of the lens at an optical axis of the lens.

4. The image sensor of claim 1, wherein the planar sensor array intersects the locus of focal points of the lens at two or more separate focal zones.

5. The image sensor of claim 1, wherein the first area of the first planar cover glass includes a peripheral region of the first planar cover glass.

6. The image sensor of claim 1, wherein the first area of the first planar cover glass corresponds to field angles greater than 15°.

7. The image sensor of claim 1, wherein the second cover glass is the planar cover glass and includes a through hole formed therein.

8. The image sensor of claim 1, wherein the second cover glass is characterized by at least two flat steps having different thickness levels and includes a tapered edge between the two flat steps.

9. The image sensor of claim 1, wherein the second cover glass includes a vertical stack of two or more planar cover glasses having different dimensions.

10. The image sensor of claim 1, wherein the second cover glass includes two or more planar cover glasses positioned in different areas on the first planar cover glass and having different thicknesses or refractive indices.

11. An apparatus comprising:
    a printed circuit board;
    a cover mounted on the printed circuit board and having an aperture;
    a lens positioned in the aperture;
    a planar sensor array electrically coupled to the printed circuit board;
    a first planar cover glass on the planar sensor array; and
    a second cover glass on a first area of the first planar cover glass and configured to shift a first portion of a locus of focal points of the lens such that a middle region of the first portion of the locus of focal points intersects the planar sensor array and peripheral regions of the first portion of the locus of focal points do not intersect the planar sensor array,
    wherein the second cover glass is a planar cover glass or includes a plurality of flat steps characterized by discrete thickness levels; and
    wherein at least two points of the first portion of the locus of focal points on opposite sides of an intersect point of the first portion of the locus of focal points and the planar sensor array are on opposite sides of the planar sensor array.

12. The apparatus of claim 11, wherein the lens includes a single aspherical lens and is configured to form an optical image on the planar sensor array.

13. The apparatus of claim 11, wherein the lens and the planar sensor array are configured such that the apparatus is characterized by a field of view greater than ±30°.

14. The apparatus of claim 11, wherein the planar sensor array is positioned to intersect a second portion of the locus of focal points of the lens at an optical axis of the lens.

15. The apparatus of claim 11, wherein the planar sensor array intersects the locus of focal points of the lens at two or more separate focal zones.

16. The apparatus of claim 11, wherein the lens is characterized by a focal length less than 20 mm.

17. The apparatus of claim 11, wherein the first area of the first planar cover glass includes a peripheral region of the first planar cover glass.

18. The apparatus of claim 11, wherein the second cover glass is the planar cover glass and includes a through hole formed therein.

19. The apparatus of claim 11, wherein the second cover glass is characterized by at least two flat steps having different thickness levels and includes a tapered edge between the two flat steps.

20. The apparatus of claim 11, wherein the second cover glass includes a vertical stack of two or more planar cover glasses having different dimensions.

21. The apparatus of claim 11, wherein the second cover glass includes two or more planar cover glasses positioned in different areas on the first planar cover glass and having different thicknesses or refractive indices.

22. The apparatus of claim 11, wherein the second cover glass is characterized by a ring shape.

23. The apparatus of claim 11, further comprising a processor coupled to the planar sensor array directly or through the printed circuit board.

24. An optical sensor comprising:
a planar sensor array;
a lens configured to form an optical image on the planar sensor array, wherein a locus of focal points of the lens is on a curved surface; and
a cover glass on the planar sensor array and including a first planar region and a second planar region, wherein the second planar region of the cover glass has a higher thickness or a higher refractive index than the first planar region of the cover glass and is configured to shift a first portion of the locus of focal points of the lens such that a middle region of the first portion of the locus of focal points intersects the planar sensor array at one or more points and peripheral regions of the first portion of the locus of focal points do not intersect the planar sensor array;
wherein at least two points of the first portion of the locus of focal points on opposite sides of an intersect point of the first portion of the locus of focal points and the planar sensor array are on opposite sides of the planar sensor array.

25. The optical sensor of claim 24, wherein the second planar region of the cover glass corresponds to field angles greater than 15°.

26. The optical sensor of claim 24, wherein the planar sensor array is positioned to further intersect a second portion of the locus of focal points of the lens at an optical axis of the lens.

27. The optical sensor of claim 24, wherein the cover glass includes a vertical stack of two or more planar plates characterized by different respective sizes.

28. An apparatus comprising:
means for forming an optical image of an object, wherein a locus of focal points of the means for forming the optical image is on a curved surface;
means for receiving and converting the optical image into electrical image data;
means for covering and protecting the means for receiving and converting the optical image; and
means for shifting a first portion of the locus of focal points such that a middle region of the first portion of the locus of focal points intersects the means for receiving and converting the optical image at one or more points and peripheral regions of the first portion of the locus of focal points do not intersect the means for receiving and converting the optical image, wherein the means for shifting the first portion of the locus of focal points includes a first planar region and a second planar region, wherein the second planar region has a higher thickness or a higher refractive index than the first planar region and is configured to shift the first portion of the locus of focal points;
wherein at least two points of the first portion of the locus of focal points on opposite sides of an intersect point of the first portion of the locus of focal points and the means for receiving and converting the optical image are on opposite sides of the means for receiving and converting the optical image.

29. The apparatus of claim 28, wherein the means for receiving and converting the optical image is positioned to further intersect a second portion of the locus of focal points.

* * * * *